(12) United States Patent
Rappenecker et al.

(10) Patent No.: US 6,876,165 B1
(45) Date of Patent: Apr. 5, 2005

(54) METHOD FOR OPERATING AN ELECTRIC MOTOR, AND AN ELECTRIC MOTOR FOR CARRYING OUT SUCH A METHOD

(75) Inventors: Hermann Rappenecker, Vöhrenbach (DE); Frank Jeske, Georgen (DE); Jörg Hornberger, Dornstetten (DE); Arno Karwath, Rottweil (DE)

(73) Assignee: ebm-papst St. Georgen GmbH & Co. KG (DE)

( * ) Notice: Subject to any disclaimer, the term of this patent is extended or adjusted under 35 U.S.C. 154(b) by 0 days.

(21) Appl. No.: 09/979,337
(22) PCT Filed: May 16, 2000
(86) PCT No.: PCT/EP00/04359
§ 371 (c)(1), (2), (4) Date: Nov. 20, 2001
(87) PCT Pub. No.: WO00/72423
PCT Pub. Date: Nov. 30, 2000

(30) Foreign Application Priority Data

May 21, 1999 (DE) ......................................... 199 23 336
May 21, 1999 (DE) ......................................... 199 23 337

(51) Int. Cl.[7] ........................ H01R 39/46; H02K 13/00; H02P 7/50
(52) U.S. Cl. ....................................... 318/439; 318/254
(58) Field of Search ................................. 318/439, 254, 318/430, 434, 781–783

(56) References Cited

U.S. PATENT DOCUMENTS

| 3,873,897 A | | 3/1975 | Müller et al. ................ 318/138 |
| 4,967,304 A | * | 10/1990 | Dougherty .................... 361/31 |
| 5,189,350 A | | 2/1993 | Mallett ......................... 318/434 |
| 5,233,958 A | * | 8/1993 | Knoss et al. ................. 123/396 |
| 5,293,572 A | * | 3/1994 | Hasegawa et al. .......... 714/703 |
| 5,712,969 A | * | 1/1998 | Zimmermann et al. ........ 714/5 |
| 5,889,939 A | * | 3/1999 | Iida .............................. 714/47 |
| 5,903,462 A | | 5/1999 | Wagner et al. ........... 364/474.1 |
| 6,237,112 B1 | * | 5/2001 | Yoo et al. ..................... 714/30 |

FOREIGN PATENT DOCUMENTS

| DE | 42 31 347 C1 | 10/1993 |
| DE | 197 05 543 A1 | 8/1998 |
| DE | 197 16 520 A1 | 11/1998 |
| GB | 2 215 148 | 9/1989 |

OTHER PUBLICATIONS

Brod, Günter: "Nichts bleibt verborgen," In: *drive & Control* 2–3/93, S.10, S.11; (Feb. 1993).
Fichtner, Helmut: "Antrieb mit Eigeninitiative," In: *Industrie–Elektrik + Electronik*, 35. Jg., 1990, Nr. 1, S. 50,51.
Schiftner, K.: "Antriebssysteme für die Traktion," In: *Elin–Zeitschrift* 1990, H. 1/2, S. 7–20;(1990).
Achenbach, Joachim, "Hat sich gemausert," in *Elektrotechnik*, vol. 73, No. 1/2, pp 28–33 (Feb. 15, 1991).
Peltola, Mauri, et al.: "ACS 600–Antriebe mit direkter Drehmomentregelung," In: *ABB Technik* 6/1997, S. 31–39.
Gedeon, Georg et al., "Mikrocomputer steuert Antrieb für Intercity Express," in: *Energie & Automation*, vol. 11, No. 1, pp. 2–23, (1989).
AWC Incorporated, "Siemens Variable Frequency Drives," retreived Nov. 6, 2001 from WWW.AWC–CORP.COM/Products/Siemens_VFDs.html.

* cited by examiner

Primary Examiner—Marlon Fletcher
(74) Attorney, Agent, or Firm—Milton Oliver, Esq.; Ware Fressola Van Der Sluys & Adolphson LLP

(57) ABSTRACT

The invention concerns a method for operating an electric motor (32) with which a microprocessor or microcontroller (23) and a nonvolatile memory (74) are associated, at least one operating data value of the motor (32) being automatically saved under program control in the nonvolatile memory (74) upon occurrence of an error. An electric motor for carrying out such a method is also described. The result of the invention is to increase the operating reliability of a motor, since the saved data can be polled from time to time or after occurrence of an error. The manner in which such errors are processed is also described.

29 Claims, 19 Drawing Sheets

Objecttable 111

| Index | Memorytype | Access | Name |
|---|---|---|---|
| 0x20 | unsigned8 | R/W | DIST_CTRL |
| 0x21 | unsigned8 | R/W | DIST_STATE |
| 0x22 | unsigned16 | R/W | DIST_CODE |
| 0x23 | unsigned8 | R/W | DIST_REAC |
| 0x24 | unsigned8 | R/W | n_DIST |
| 0x25 | unsigned8 | R/W | t_COMM_TO |
| 0x30 | unsigned8 | R/W | OD_TMAX |
| 0x31 | unsigned8 | R/W | OD_UBMAX |
| 0x32 | unsigned24 | R/W | OD_OHO |
| 0x33 | unsigned24 | R/W | OD_COMMUT |

Fig. 8

DI_CTRL

| Bit | Name | LOW | HIGH |
|---|---|---|---|
| 0 | DC_LATCH | NO_LATCH | LATCH |
| 1-6 | RES | | |
| 7 | DC_CLEAR | 0 -> 1 -> 0 to clear | |

Fig. 9

DI_STATE

| Bit | Name | VAL | Meaning |
|---|---|---|---|
| 0-2 | DS_CLASS | 0 | DS_µC |
| | | 1 | DS_COMM |
| | | 2 | DS_SENS |
| | | 3 | DS_HW |
| | | 4-7 | RES |
| 3-6 | RES | | |
| 7 | DS_ACTIVE | 0 | NO_DIST |
| | | 1 | DIST |

Fig. 10

DI_CODE (16 Bit)

| Class | VAL | Name |
|---|---|---|
| DS_μC | 0-999 | |
| | 0 | DN_WDT |
| | 1 | DN_CHKS_ROM |
| | 2 | DN_CHKS_RAM |
| | 3 | DN_CHKS_EEPROM |
| | 4 | DN_TEST_RAM |
| | 5-999 | RES |
| DS_COMM | 1000-1999 | |
| | 1000 | DN_TIMEOUT_TRANSFER |
| | 1001 | DN_TIMEOUT_BUS |
| | 1002 | DN_PROT_ERR |
| | 1003 | DN_INVAL_DATA |
| | 1004-1999 | RES |
| DS_SENSOR | 2000-2999 | |
| | 2000 | DN_SENSOR_INTERRUPT |
| | 2001 | DN_SENSOR_SHORT |
| | 2002-2999 | RES |
| DS_HW | 3000-3999 | |
| | 3000 | DN_DRIVER_FAULT |
| | 3001-3999 | RES |
| RES | 4000-65535 | |

Fig. 11

DI_REAC

| Bit | Name | VAL | Meaning |
|---|---|---|---|
| 0-2 | DR_REAC | 0 | DR_OFF |
| | | 1 | DR_n_max |
| | | 2 | DR_n_min |
| | | 3 | DR_n_0 |
| | | 4 | DR_n_DIST |
| | | 5 | DR_BRAKE |
| | | 6-7 | RES |
| 3 | DR_AL | 0 | DR_AL_OFF |
| | | 1 | DR_AL_ON |
| 4-7 | RES | | |

Fig. 12

METHOD FOR OPERATING AN ELECTRIC MOTOR, AND AN ELECTRIC MOTOR FOR CARRYING OUT SUCH A METHOD

The invention concerns a method for operating an electric motor, in particular an electronically commutated electric motor, a microprocessor or microcontroller and a nonvolatile memory being associated with the electric motor. The invention further concerns an electric motor for carrying out such a method.

Electric motors are often used for critical driving tasks in which a failure of the motor can result in serious consequential damage. It is therefore important to make suitable provisions—which may differ depending on the application—for the occurrence of a fault or malfunction.

It is therefore an object of the invention to make available a new method of the aforesaid kind, and a corresponding electric motor.

According to the invention, this object is achieved by means of the subject matter of claim 1. Because it is saved in the nonvolatile memory, the at least one operating data value can be examined after occurrence of to the fault, and from it conclusions can be drawn as to the cause of the fault. Alternatively, said operating data value can be polled from time to time, and the motor can be replaced when a specific criterion is reached. Lastly, it is also possible to monitor the corresponding operating data values for several motors continuously via a data bus, and if applicable to control said motors accordingly via the data bus.

Another way of achieving the stated object is evident from the subject matter of claim 13.

When an electronically commutated motor is commutated by means of a microprocessor, the microprocessor usually has additional tasks, for example controlling the rotation speed of the motor. These tasks can be configured in terms of programming as routines of various priorities; and in the course of such routines, faults can also occur and must then result in a corresponding reaction. But such a reaction could, for example, disrupt the execution of a control operation.

Another way of achieving the stated object is therefore evident from the subject matter of the claims. Because identification of a fault causes a fault signal to be set and predetermined data to be saved, the result is, so to speak, a "fact sheet" about the fault. The fault monitoring routine monitors whether a fault signal is set, and reacts thereto as applicable. That reaction is influenced by at least one parameter that is saved in the nonvolatile memory. It is thereby possible to configure the reaction individually, since the parameter in the nonvolatile memory can be modified.

Another way of achieving the stated object is evident from an electric motor according to the claims.

Further details and advantageous developments of the invention are evident from the exemplary embodiments—which are in no way to be understood as a limitation of the invention—that are described below and depicted in the drawings, and from the dependent claims.

In the drawings:

FIG. 8 is a table with objects which contain parameters for motor 32 of FIG. 2;

FIG. 9 shows a control word DI_CTRL that is used by the error function (FIGS. 2 and 23);

FIG. 10 shows a state word DI_STATE that is used by the error function;

FIG. 11 shows an error code DI_CODE that is used by the error function;

FIG. 12 shows a reaction word DI_REAC that is used by the error function;

In the flow charts hereinafter, Y=Yes and N=No. Identical or identically functioning parts are labeled with the same reference characters and usually are described only once.

GENERAL OVERVIEW (FIG. 1)

Figure 1:
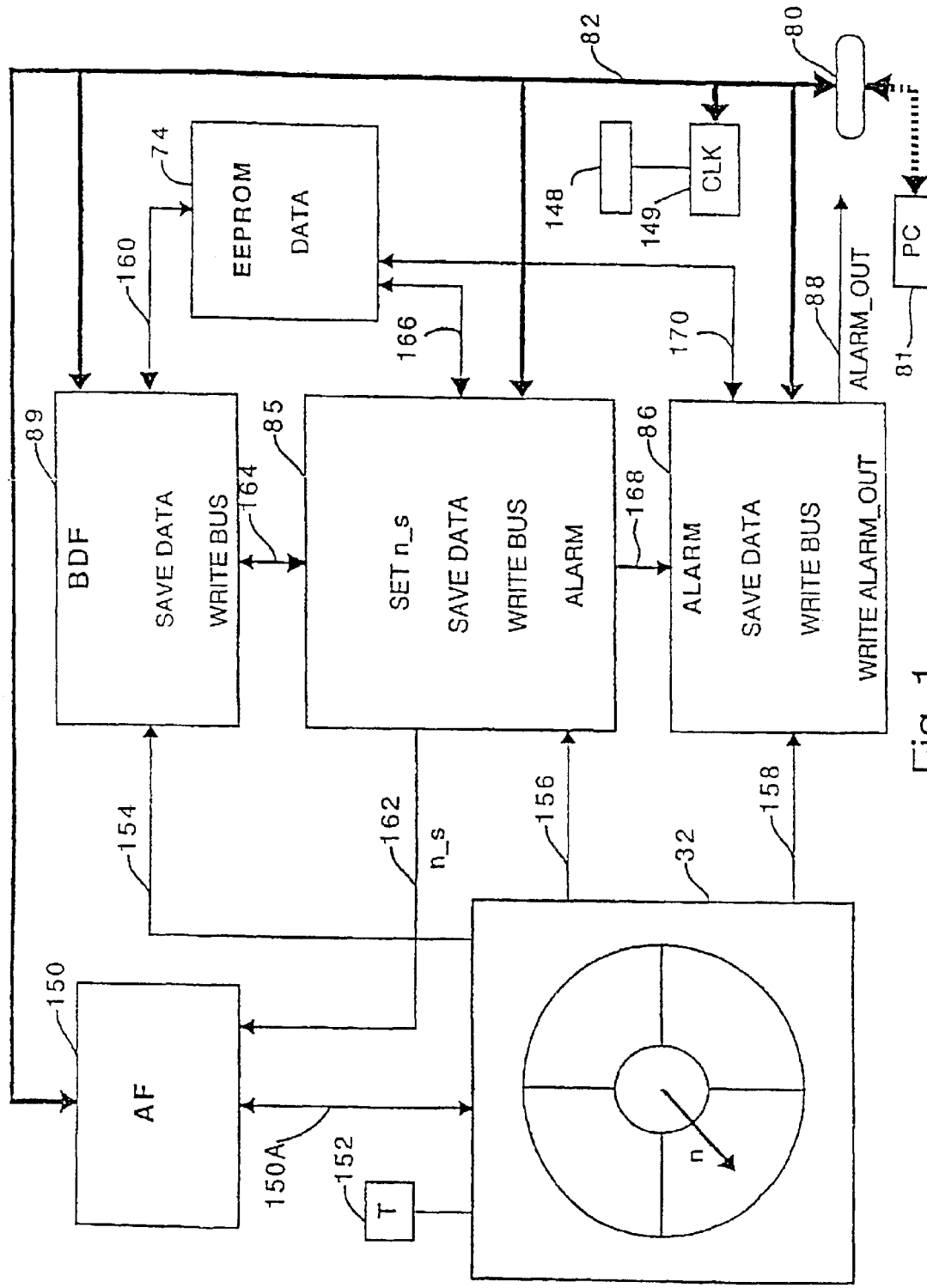
FIG. 1 is a general overview of an arrangement according to the present invention having an electric motor.

FIG. 1 is an overview of an arrangement according to the present invention having an electric motor 32 that serves, for example, to drive a fan as shown in FIG. 1. Associated with electric motor 32 are a drive function "AF" 150, a temperature sensor 152, an operating data function "BDF" 89, an error function 85, an alarm function "ALARM" 86, a nonvolatile memory 74 (e.g. an EEPROM), a bus 82, a bus interface 80, and an alarm output ALARM_OUT 88.

Temperature sensor 152 serves to measure temperature T at motor 32 or in its vicinity, in order to control operations as applicable on the basis of said temperature T, for example to define a rotation speed n_s, dependent on said temperature, of motor 32; or to trigger an alarm signal if said temperature becomes too high; or to save the maximum values of said temperature.

Drive function "AF" 150 ensures that electric motor 32 runs in a desired direction and at the desired rotation speed n_s. For that purpose, drive function "AF" 150 is connected via a connection 150A to electric motor 32. The drive function can be implemented, for example, as a commutation control system of an electronically commutated motor (ECM) 32.

Drive function 150 is connected to bus 82, which is configured bidirectionally. Bus 82 has an interface 80 to which, for example, a PC 81 can be connected via bus 82, drive function "AF" 150, operating data function "BDF" 89, error function 85, and alarm function "ALARMs" 86 can be configured, for example, by PC 81 or by another input device. Data from these functions and from EEPROM 74 can, however, also be written onto bus 82 and transferred by way of it to, for example, the external PC 81 or to another motor: for example, the number of operating hours of motor 32, or a datum concerning errors that have occurred, an extreme temperature, an excessive operating voltage, etc.

Through a connection 154, electric motor 32 delivers operating data to operating data function "BDF". The latter can save the operating data via a connection 160 in nonvolatile memory 74 ("SAVE DATA"), or write them onto bus 82 ("WRITE BUS") so that said data can be read by PC 81 via bus interface 80.

An error in electric motor 32 is reported, via connection 156, to error function 85. Upon occurrence of an error, the latter can modify rotation speed target value n_s ("SET n_s") via a connection 162 that leads to drive function "AF" 150; write into nonvolatile memory 74, via a connection 166, data concerning the error and instantaneous operating data that are obtainable via a connection 164 from operating data function "BDF" 89 ("SAVE DATA"); output data concerning the error and instantaneous operating data via bus 82 ("WRITE BUS"); or, via a connection 168, trigger an alarm in alarm function 86 ("ALARM").

Alarm function 86 either receives a signal from error function 85 via a connection 168, or receives a signal directly from motor 32 via a connection 158. The alarm function can write data concerning the alarm and instantaneous operating data into nonvolatile memory 74 via a connection 170 ("SAVE DATA"), and/or it writes said data onto bus 82 ("WRITE BUS"), and/or it outputs a signal via a line ALARM_OUT 88 ("WRITE ALARM_OUT").

Nonvolatile memory 74 can contain data that were saved by functions 89, 85, 86, and that can also be read out again by them and can be outputted, for example, when polled via bus 82. Nonvolatile memory 74 can moreover contain configuration parameters for functions 150, 89, 85, 86.

Connected to bus 82 is a clock CLK 149 that is backed up by a battery 148 and thus runs continuously. The following models are suitable, for example, for an I²C bus: PCF8563, PCF8573, or PCF8583. By means of clock 149, it is possible to save, in EEPROM 74, the time of day at which an error occurred, and optionally also the date.

The configuration of a preferred arrangement according to FIG. 1 and of a program used in its context will be described in more detail below.

Figure 2:
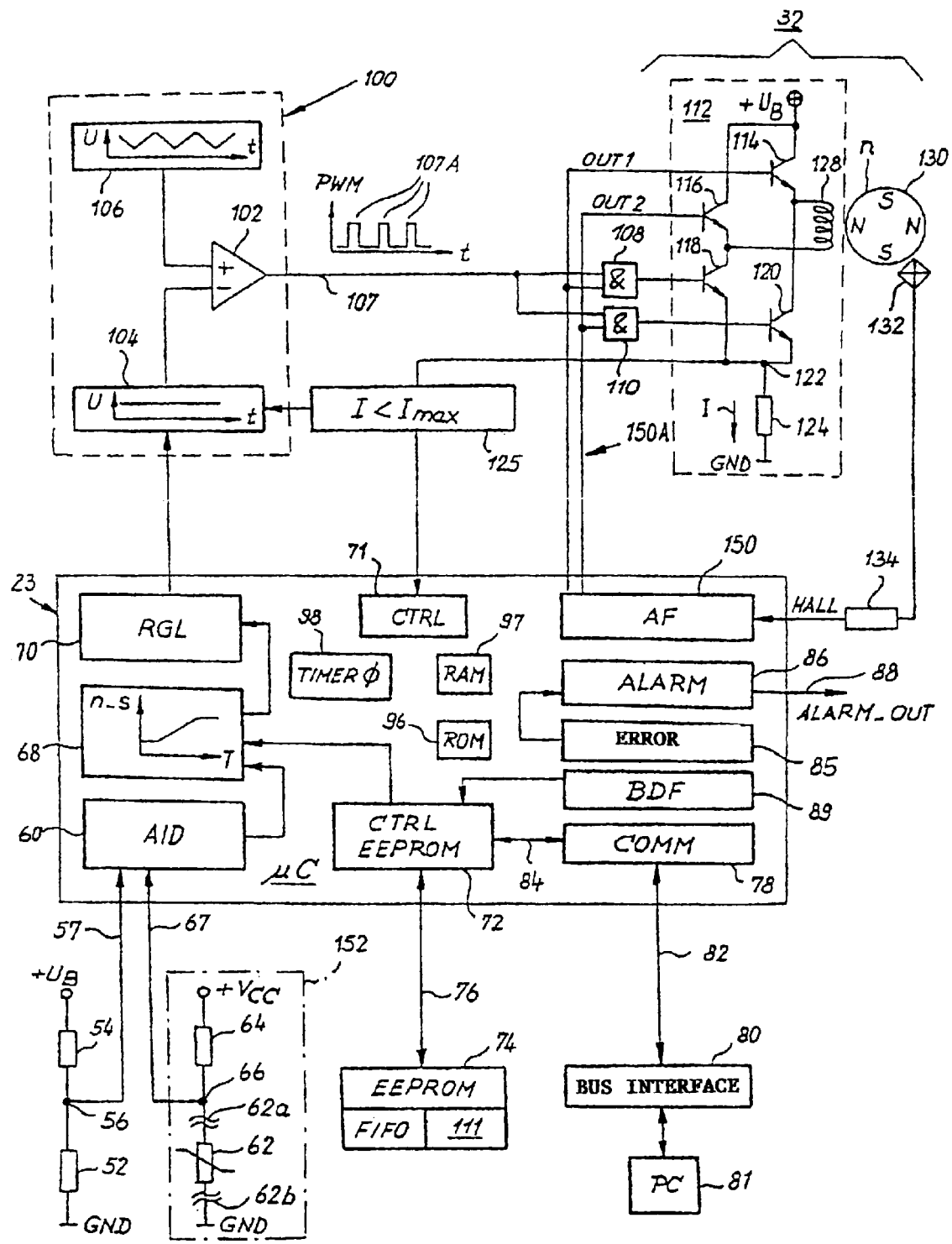
FIG. 2 is an overview circuit diagram of a preferred embodiment having an electronically commutated motor.

Motor Overview (FIG. 2)

FIG. 2 shows an overview of a preferred exemplary embodiment of an electronically commutated motor (ECM) 32 according to the present invention. The latter is controlled by means of a microcontroller (μC) 23, or alternatively a microprocessor. μC 23 has an A/D converter 60, a characteristic function 68, a "RGL" function (controller function) 70, a "CTRL" function (motor current monitor) 71, a "CTRL EEPROM" function 72, a "COMM" function (communication function) 78, "FEHLER" function (error function) 85, ALARM function 86, "BDF" function (operating data function) 89, and "AF" function (drive function) 150.

A resistor 52 is connected between a node 56 and ground (GND), and a resistor 54 is present between an operating voltage $U_B$ and node 56. Node 56 is connected to input 57 of A/D converter 60. This arrangement serves to digitize a value corresponding to operating voltage $U_B$.

An NTC resistor 62 (in temperature sensor 152) is connected between a node 66 and ground (GND), and a resistor 64 is connected between a regulated voltage Vcc (e.g. +5V) and node 66. Node 66 is connected to input 67 of A/D converter 60. This arrangement serves to digitize a temperature sensed with NTC resistor 62.

EEPROM 74 is connected via a bus 76 to "CTRL EEPROM" function 72. Instead of EEPROM 74 it is possible to use, for example, a flash ROM, a reprogrammable flex ROM cell, or another nonvolatile memory. EEPROM 74 can optionally be integrated into μC 23.

Bus interface 80 is connected via bus 82 to communication function COMM 78. The latter is in turn connected via a line 84 to "CTRL-EEPROM" function 72 and to other functional elements of μC 23. "ALARM" function 86 can output a signal at output ALARM_OUT 88.

In this embodiment, "RGL" function 70 is, by way of example, connected to a pulse width modulation generator (PWM generator) 100. The PWM generator comprises a control voltage generator 104, a triangular generator 106, and a comparator 102, and its manner of operation is described in more detail with reference to FIG. 3. Through output 107 of PWM generator 100, a signal PWM passes to two logical AND elements 108, 110. The width of pulses 107A of signal PWM is variable.

As a simple example, FIG. 2 depicts an electronically commutated motor 32 having a single phase 128. The principle of a simple motor of this kind is explained, for example, in German Pat. No. 23 46 380 C. Motor 32 comprises a permanent-magnet rotor 130, a Hall sensor 132, and an output stage 112.

Output stage 112 has four npn transistors 114, 116, 118, 120 connected as an H-bridge, and a low-resistance resistor 124 for current measurement.

A current limiter "I<$I_{max}$" 125 receives a voltage corresponding to the value of motor current I measured at resistor 124 and, if motor current I is too high, influences control voltage generator 104 so as to reduce said current. Current limiter 125 is also associated to "CTRL" function (motor current monitor) 71 in μC 23.

Figure 4:
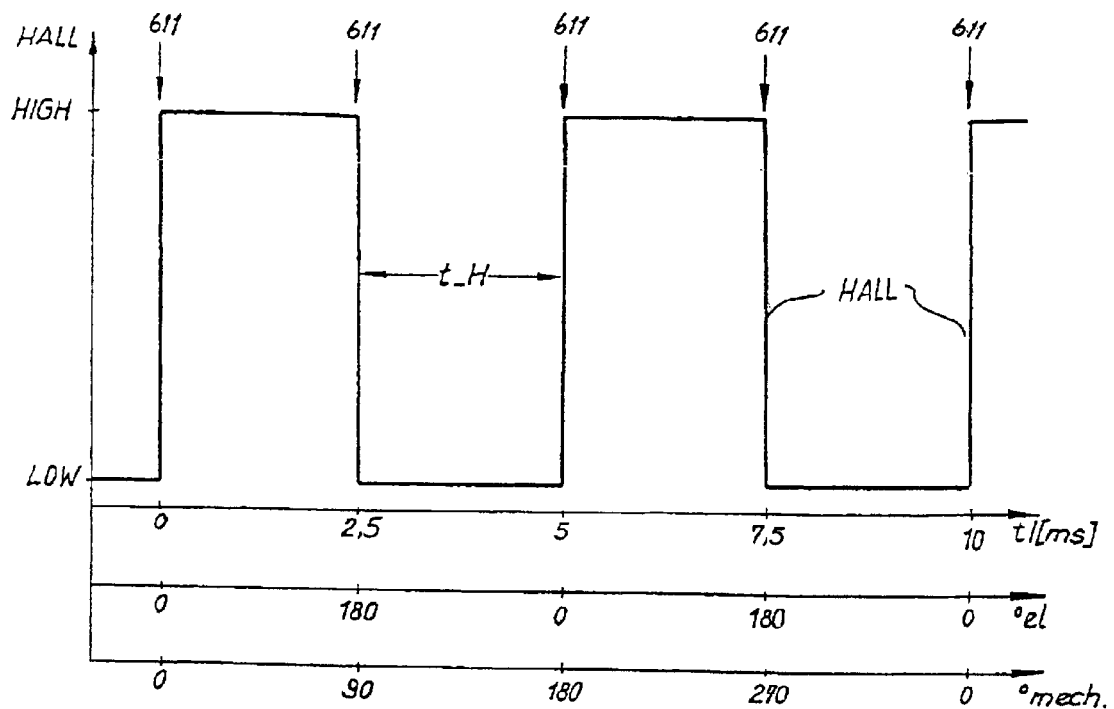
FIG. 4 is a schematic diagram of a signal HALL detected by a rotor position sensor 132 and transferred to $\mu$C 23 of FIG. 2.

The signal of Hall sensor 132 is delivered to an evaluation circuit 134, which contains a lowpass filter e.g. in the form of a comparator and which generates signal HALL, depicted in FIG. 4, that is delivered to "AF" function 150. The latter controls two outputs OUT1 and OUT2 which control upper transistors 114, 116 and (via AND elements 108, 110) lower transistors 118, 120.

μC 23 furthermore has a ROM 96, a RAM 97, and a timer 98 which is also referred to as TIMERø. ROM 96 is usually programmed concurrently with the manufacture of μC 23. It can also be arranged outside μC 23, as can RAM 97 and timer 98, as is known to those skilled in the art.

Mode of Operation

Phase 128 is energized by means of transistor output stage 112. Outputs OUT1, OUT2 control transistors 114, 116, 118, 120 that are connected as H-bridge 112. If OUT1 is HIGH and OUT2 is LOW, transistors 114 and 118 are conductive and a current flows from operating voltage +$U_B$ through transistor 114, stator winding 128, transistor 118, and resistor 124 to ground GND. It is assumed in this discussion that signal PWM (line 107) is continuously HIGH, since otherwise AND elements 108, 110 and therefore transistors 118, 120 are blocked.

If OUT1 is LOW and OUT2 is HIGH, a current then flows from $U_B$ through transistor 116, through stator winding 128 in the opposite direction, and through transistor 120 and resistor 124 to ground GND.

The alternating magnetic flux generated by stator winding 128 exerts a torque on permanent-magnet rotor 130 and drives it. In this exemplary embodiment, rotor 130 is depicted with four poles.

The position of rotor 130 is sensed via Hall sensor 132. The latter's signal is filtered through a lowpass filter in circuit 134 and processed to yield a square-wave digital signal HALL (FIG. 4), which is delivered to "AF" function 150.

"AF" function 150 controls outputs OUT1, OUT2 on the basis of signal HALL. In this example, the commutation of motor 32 is accomplished electronically and is explained below with reference to FIG. 13. "AF" function 150 ensures not only correct commutation but also reliable operation of motor 32, for example in the event of an overload of transistor output stage 112. Commutation can also be implemented in such a way that transistors 114 through 120 are commutated earlier as the rotation speed increases, somewhat analogously to ignition advance in a gasoline engine.

Of course the invention is similarly suitable for any type of motor, e.g. for three-phase ECMs and others. This is therefore only a simple exemplary embodiment in order to facilitate understanding of the invention.

In this exemplary embodiment, rotation speed control is achieved by controlling pulse duty factor PWM_TV of signal PWM at output 107 of controller 100, i.e. by making pulses 107A longer or shorter (see FIG. 3C for a definition of pulse duty factor PWM_TV). The greater this pulse duty factor, the longer pulses 107A become, and the longer the output of AND element 108 or 110 (controlled at the time by OUT1 or OUT2) is switched to HIGH. Stator winding 128 is therefore energized for a longer period, and motor 32 is more strongly driven. If OUT1 is HIGH and OUT2 is LOW, for example, upper transistor 114 is made conductive, and lower transistor 118 is switched on and off by AND element 108 in accordance with signal PWM.

In this exemplary embodiment, "RGL" function 70 controls rotation speed n of motor 32 via PWM generator 100. For that purpose, "RGL" function 70 has available to it rotation speed n of rotor 130, which is calculated using signal HALL (see description with reference to FIG. 4), and rotation speed target value n_s, which in this exemplary embodiment is determined by characteristic function 68. Rotation speeds n and n_s can be present, for example, in the form of Hall times t_H (FIG. 4), e.g. in units of microseconds or seconds; or as rotation speeds, e.g. in units of revolutions per minute.

In this example, characteristic function 68 associates a rotation speed target value n_s(T) with each temperature T sensed by sensor 152 of FIG. 1. Temperature T is sensed by means of NTC resistor 62 which, together with resistor 64, constitutes a voltage divider between Vcc and ground (cf. FIG. 2). The potential at node 66, which constitutes an indication of the temperature of resistor 62, is digitized by A/D converter 60 located in $\mu$C 23, and delivered to characteristic function 68.

From temperature T, characteristic function 68 determines rotation speed target value n_s(T) of motor 32. For that purpose the value n_s(T) pertinent to temperature T is loaded, for example via a "CTRL EEPROM" function 72, from a temperature/rotation speed target value table in EEPROM 74. For another preferred variant in which only control points [Eckpunkte] of a characteristic are saved and interpolation is performed between said control points, the reader is referred to German Patent Application 198 36 882.8 (internal: D216) to avoid unnecessary length.

The "COMM" function manages bus interface 80 over which data can be transferred from outside into $\mu$C 23, and over which, conversely, data can be transmitted to the outside from $\mu$C 23. For example, data that arrive in $\mu$C 23 via bus interface 80 by means of "COMM" function 78 can be written, via connection 84 and by means of "CTRL EEPROM" function 72, into EEPROM 74.

Figure 3:
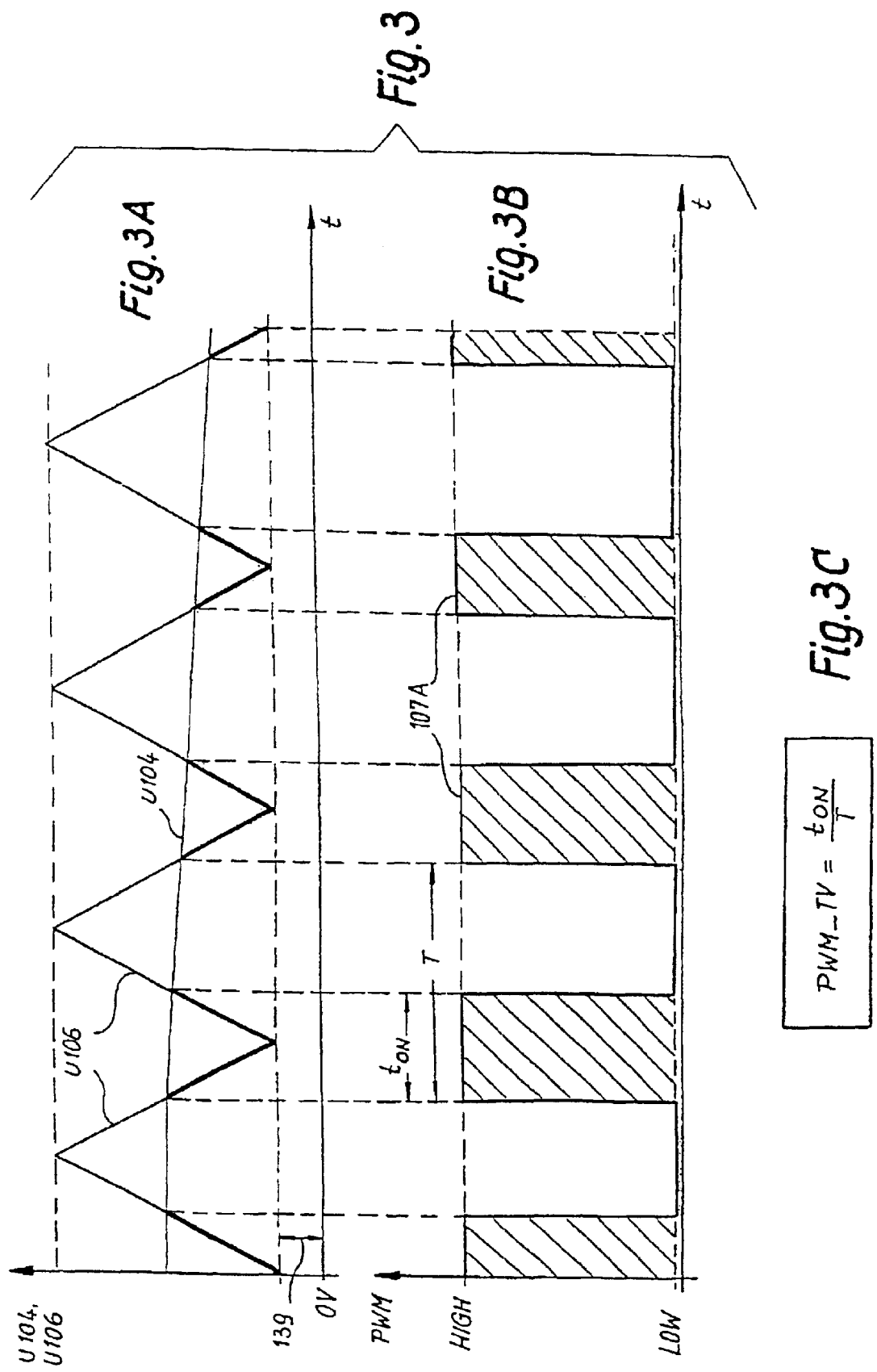
FIG. 3A–3C show exemplary diagrams of voltages and signals occurring in triangular generator 100 of FIG. 2.

PWM Generator (FIG. 3)

FIG. 3A shows a triangular signal u106 of triangular generator 106, and a control output u104 that is generated by control voltage generator 104. FIG. 3B shows pulses 107A resulting from FIG. 3A, and FIG. 3C shows the calculation of pulse duty factor PWM_TV of pulses 107A.

Triangular signal u106 from triangular generator 106 is depicted in idealized fashion. In reality, it is not perfectly triangular in shape, although this makes no difference in terms of the manner of operation of PWM generator 100 of FIG. 2. Triangular signal u106 has an offset 139 from voltage 0V. Control output u104 therefore causes a pulse duty factor PWM_TV>0 only when it is greater than offset 139.

Pulse duty factor PWM_TV of signal PWM is the ratio between the duration $t_{ON}$ that signal PWM is HIGH during one period of triangular signal u106, and one entire period T of triangular signal u106 (cf. FIG. 3B). The equation is:

$$PWM\_TV = t_{ON}/T \tag{1}$$

Pulse duty factor PWM_TV can be between 0 and 100%. For example, if the motor rotation speed is too high, control output u104 is then decreased and pulse duty factor PWM_TV is thus made smaller, as depicted in FIG. 3A. This entire procedure is referred to as pulse width modulation (PWM).

A motor 32 according to the present invention can, of course, also be operated without pulse width modulation, e.g. without control, or with a different kind of control. This serves only as an example to facilitate comprehension.

Signal Hall (FIG. 4)

FIG. 4 shows signal HALL, which corresponds to the position of rotor 130 sensed by Hall sensor 132 (FIG. 1) and is delivered to $\mu$C 23 via circuit 134 (FIG. 2).

As an example, rotor 130 can have a rotation speed n=6000 rpm, corresponding to 100 revolutions per second. One mechanical rotation of rotor 130 then lasts 10 ms. Rotor 130 is depicted with four poles in this exemplary embodiment, so that four Hall changes—two from HIGH to LOW and two from LOW to HIGH—take place in one mechanical revolution (360° mech.). One electrical revolution (360° el.), on the other hand, has already taken place after only two Hall changes. In a four-pole motor, therefore, two electrical revolutions take place for one mechanical revolution.

Rotation speed n is calculated from Hall time t_H (FIG. 4) between two Hall changes, using $$t\_H = T/P \quad (2)$$

In addition, $T = (60\ seconds)/n$      (3)

Combining (2) and (3) yields $$t\_H = ((60\ seconds)/n)/P \quad (4)$$

where
   T = duration (in seconds) of one mechanical revolution of rotor 130;
   P = number of poles of the rotor (here P = 4); and
   n = rotation speed in rpm.
If n = 6000 rpm and P = 4, equation (4) yields
   t_H = 60 seconds/6000/4 = 2.5 ms.

At a rotation speed of 6000 rpm, time offset t_H between two changes of signal HALL is therefore 2.5 ms, as depicted by way of example in FIG. 4.

Figure 5:
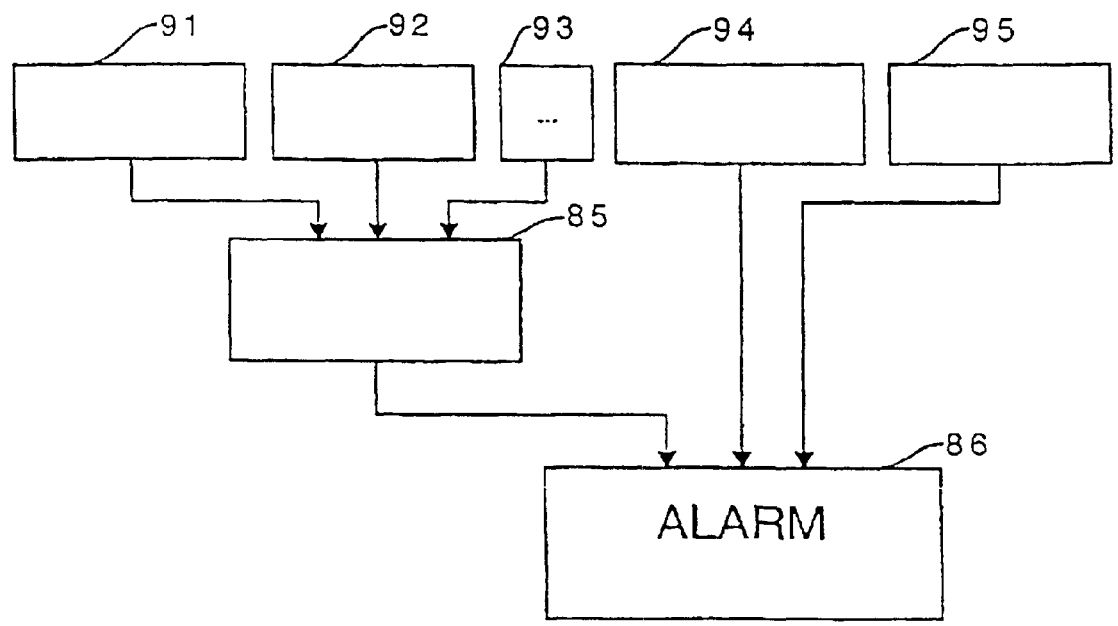
FIG. 5 is an overview diagram of error function 85 and alarm function 86 implemented in FIG. 1.

Overview of Error and Alarm Functions (FIG. 5)

FIG. 5 shows an overview of the interaction, in terms of program engineering, between error function 85 and "ALARM" function 86 for a motor 32 as shown in FIG. 1.

"Sensor interruption" function 91, "bus error check" function 92, "temperature check" function 94, and "rotation speed check" function 95 are depicted in the top row. The number 93 represents any further checks that are not depicted.

Considered in terms of program engineering, the checks are located at the point at which the respective measurement takes place. When A/D converter 60 is polled, for example, a check is made on the basis of the value in "sensor interruption check" 91 as to whether a "sensor interruption" of NTC resistor 62 (FIG. 1) is present (cf. FIG. 16, S226 below). This means that in FIG. 2, the connection to NTC resistor 62 is interrupted at point 62a and/or 62b, i.e. the line has been broken. In this case "sensor interruption check" 91 reports an error, i.e. it generates an error signal. This is subsequently noted by "error function" 85 (FIG. 23), which then decides what else will happen. For example, it can set rotation speed target value n_s to a maximum value and request an alarm from alarm function 86. This is described in detail below with reference to FIG. 23, and happens on the basis of parameters that are saved in EEPROM 74 and can be modified.

"Temperature check" 94 and "rotation speed check" 95 occupy a special place. Temperature and rotation speed are so important for the functionality of a fan that an excessive deviation in rotation speed, or the fact that a predetermined temperature has been exceeded, is forwarded directly to "alarm function" 86.

Figure 23:
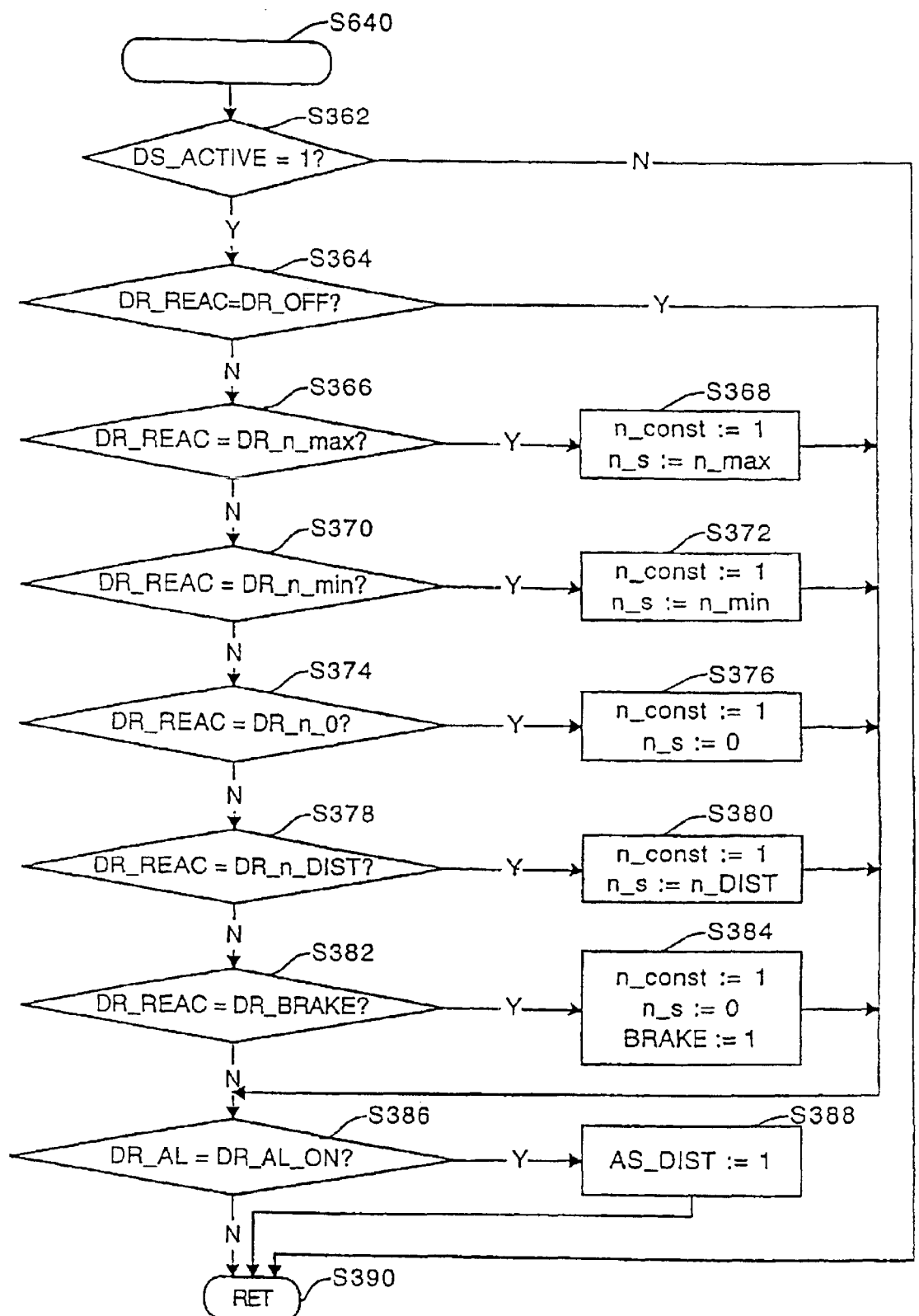
FIG. 23 is a flow chart of the "Error Function" routine of FIGS. 1 and 6.

Other errors, however, for example a sensor interruption in NTC resistor 62, do not rule out satisfactory operation of the fan and can therefore be processed by error function 85 (FIG. 23). Error function 85 can be parameterized as desired by the customer, as will be described later.

Figure 6:
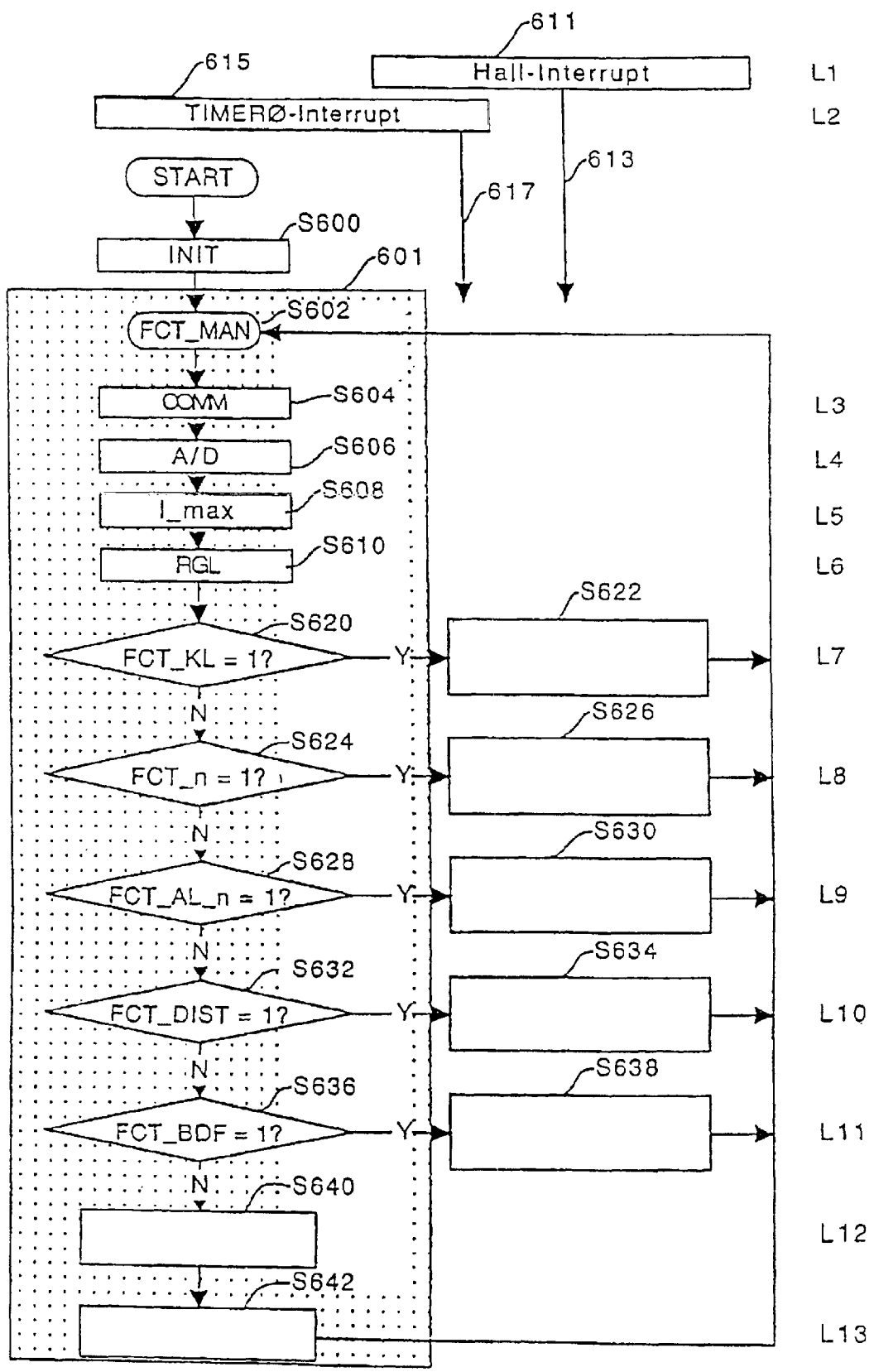
FIG. 6 shows a main program in the form of a function manager that can preferably be used in the context of a motor according to the present invention.
Figure 7:
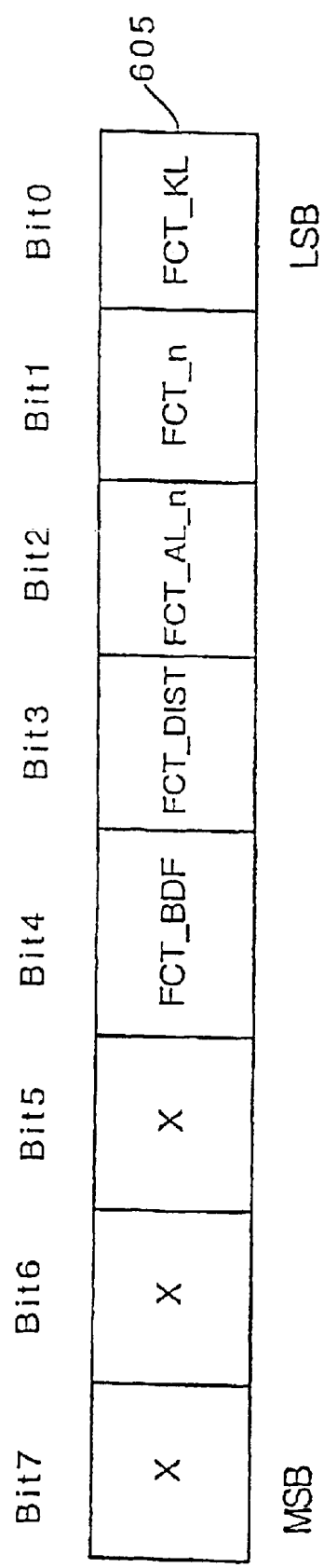
FIG. 7 depicts a control word having eight bits that serve, in the function manager of FIG. 6, to request the execution of functions or to reset said requests.

Function Manager (FIGS. 6 and 7)

FIG. 6 shows a flow chart with one possible embodiment of the main program executing in μC 23, in the form of a so-called function manager 601. The task of the main program is to react to events, e.g. to a change in signal HALL; also to make resources, in particular calculation time, available to each function as necessary; and to observe priorities in assigning resources.

After motor 32 is switched on, an internal reset is triggered in μC 23, and initialization of μC 23 takes place in S600. In this context, data are loaded from EEPROM 74 into RAM 97 of μC 23 so that they are quickly available for program execution. A memory test is also accomplished, as described below.

After initialization, execution branches into function manager 601, which begins in S602. Those functions that are time-critical and must be executed at each pass are executed first. These include functions "COMM" in S604 (cf. FIG. 24), "A/D" in S606 (cf. FIG. 16), "I_max" in S608", and "RGL" in S610.

In "COMM" function (S604), communication via bus 82 (FIG. 1) is monitored. At a baud rate of, for example, 2 K, bus 82 must be checked every 250 microseconds.

In S606, A/D converter 60 (FIG. 2) is polled. It digitizes the potentials at inputs 57, 67. Further A/D converters for digitizing further potentials can be present.

In S608, an "I_max" motor current limiting routine that may be present is executed.

The "RGL" function for controlling rotation speed n is called in S610.

FIG. 7 shows an example of a function register 605 in which one bit is reserved for each of the functions in S622, S626, S630, S634, and S638 (FIG. 6).

In this example function register 605 is one byte long, and the following bits, beginning at the least significant bit (LSB), are defined for the requestable functions explained below:

| | |
|---|---|
| FCT_KL | for the characteristic function |
| FCT_n | for the rotation speed calculation function |
| FCT_AL_n | for the alarm rotation speed check |
| FCT_DIST | for error detection |
| FCT_BDF | for the operating data function. |

The remaining bits are reserved for additional requestable functions that may be inserted into the function manager as necessary.

If, in FIGS. 6 and 7, a specific requestable function is to be requested by another function or by an interrupt routine, the bit of the function to be requested is set in function register 605 to 1, for example FCT_AL_n:=1. If function manager 601 (FIG. 6) then finds, at the pass following this request, no other requestable function with a higher priority, the aforesaid function (i.e. the alarm rotation speed check) is therefore called in S630.

Once a requested function has been executed, it sets its bit in function register 605 (FIG. 7) back to 0, (e.g. FCT_AL_ n:=0) at the end of S630.

Once the requestable function has been performed, execution-branches back to S602 at the beginning ("FCT_ MAN") of function manager 601.

In FIG. 6, after S610 the program begins with the most important requestable function and checks in a predetermined sequence as to whether its request bit is set. If so, the requested function is then performed. The higher up such a function is located in function manager 601, the higher its priority.

S620 checks whether request bit FCT_KL is set. If it is set, the characteristic function is called in S622.

If FCT_n is set in S624, the rotation speed calculation function is called in S626.

If FCT_AL_n is set in S628, the alarm rotation speed check is called in S630.

If FCT_DIST is Bet in S632, error detection (described with reference to FIG. 17) is called in S634.

If FCT_BDF is set in S636, the operating data function (described with reference to FIG. 15) is called in S638.

If none of the request bits of function register 605 was set, an error function is executed in S640 and an alarm function in S642, and execution branches back to S602. See FIG. 23 regarding error function S640; it can also be referred to as an error monitoring routine, since it monitors whether any of the other routines has reported an error, and then implements a reaction to that error.

FIG. 6 also symbolically shows a Hall interrupt 611 (FIG. 13), which has the highest priority L1 (level 1). It interrupts all the processes of function manager 601, as symbolized by an arrow 613, in order to achieve precise commutation of motor 32. A Hall interrupt 611 is generated each time signal HALL changes in FIG. 4, and it causes an incrementing of commutation counter CNT_COM as described with reference to FIG. 13. Commutation of motor 32, i.e. the generation of signals OUT1 and OUT2, is also controlled directly or indirectly by the Hall interrupts 611 in order to make the motor run smoothly (cf. also FIG. 13).

Depicted below Hall interrupt 611 at 615 is a TIMERø interrupt of timer TIMERø 98 (FIG. 2). It has a lower priority L2 and interrupts all processes below it, as indicated by arrow 617. It is described with reference to FIG. 14.

If Hall interrupt 611 and TIMERø interrupt 615 were requested simultaneously, they would be executed in the order of their priority.

The subsequent functions have increasingly lower priorities, from L3 for the "COMM" function in S604 to L13 for the alarm function in S642.

In this fashion it is possible to classify the various "needs" of motor 32 into a predetermined hierarchy, and to use the resources of µC 23 optimally for the operation of motor 32. Error function S640 and alarm function S642 are thus executed only when µC 23 presently has free calculation time.

Object Table (FIG. 8)

FIG. 8 shows a table 111 with objects that contain configuration parameters for motor 32. The individual objects have an index, a memory type, access rights, and a name.

Object table 111 is saved in a nonvolatile memory, in this exemplary embodiment in EEPROM 74 (FIG. 1). After each reset of µC 23, upon initialization in S600 (FIG. 6) object table 111 is transferred by "CTRL EEPROM" function 72 out of EEPROM 74 into RAM 97 of µC 23, and is thereupon available to the program (FIG. 6) executing in µC 23.

The index in table 111 is indicated hexadecimally, a "0x" before a number indicating hexadecimal notation. The memory type is either "unsigned8" (one byte with no sign bit), "unsigned16" (two bytes with no sign bit), or "unsigned 24" (three bits with no sign bit). The access rights are R (read) and W (write). The objects can be read out and modified. The name of the object makes utilization easier. The names denote:

| | |
|---|---|
| DIST_CTRL | Control word for the error function |
| DIST_STATE | State word for the error function |
| DIST_CODE | Error code for the error function |
| DIST_REAC | Reaction word for the error function |
| n_DIST | Error rotation speed |
| t_COMM_TO | Maximum time-out time for the communication function |
| OD_TMAX | Temperature for the operating data function |
| OD_UBMAX | Operating voltage for the operating data function |
| OD_OHO | Operating hours (e.g. in units of 10 minutes) for the operating data function |
| OD_COMMUT | Total number of commutations (e.g. in units of 10,000) for the operating data function |

Because of the open structure of object table 111, it is easily possible to insert new objects using a standardized procedure and to expand the table as desired. Any modification of object table 111 and thus of the configuration is preferably accomplished via bus 82, "COMM" function 78 (FIG. 2), and "CTRL EEPROM" function 72. Configuration can be performed to the customer's specification before delivery, or customers can be given the capability to make modifications themselves.

Explanation of the Objects in Object Table 111

DIST_CTRL is the control word for error monitoring routine 85 that is labeled S640 in FIGS. 6 and 23. Its structure is evident from FIG. 9 and the accompanying description. Depending on its content, this word causes an error either to be saved in EEPROM 74 or not to be saved. When DIST_CTRL is loaded into RAM 97, it is labeled DI_CTRL.

DIST_STATE is a state word for the error function. When DIST_STATE is loaded into RAM 97, it is labeled DI_STATE. The structure of DI_STATE is evident from FIG. 10 and the accompanying description. It indicates in its bit 7 whether an error is present, and its bits 0 through 2 approximately define the type of error that has occurred, e.g. an error in commutation or an error in sensor 152.

DIST_CODE contains error codes for error function 85 which specify the error more precisely. When DIST_CODE is loaded in RAM 97, it is labeled DI_CODE. Its structure is evident from FIG. 11 and the accompanying description. There can be, for example, four separate error codes concerning the type of transfer error for error class DS_COMM of state word DI_STATE.

DIST_REAC is a reaction word for error function 85, and indicates how the motor is to react to an error, e.g. by stopping or braking, or with maximum rotation speed. When DIST_REAC is loaded into RAM 97, it is labeled DI_REAC. Its structure is evident from FIG. 12 and the accompanying description. FIG. 23 shows how it is evaluated.

n_DIST is the error rotation speed. This is a fixed rotation speed at which motor 32 is to run in the event of an error (cf. FIG. 23, S378 and S380).

t_COMM_TO is the maximum time-out time for the communication function. It determines the transfer rate on bus 82.

OD_TMAX is the extreme upper value of temperature T measured by sensor 152. This value operates in exactly the same way as a "maximum thermometer," but digitally. Every 10 minutes, a check is made as to whether the present temperature is higher than the saved value OD_TMAX; if so, the new, higher value is saved in EEPROM 74 as OD_TMAX. This can be important for the analysis of errors. OD_UBMAX is the extreme upper value of operating voltage UB of motor 32. Every 10 minutes, a check is made as to whether the present operating voltage UB is higher than the saved value OD_UBMAX; if so, the new, higher value is saved in EEPROM 74 as OD_UBMAX. This can be important for the analysis of errors.

OD_OHO is the total number of operating hours of motor 32, measured in units of 10 minutes; OD_OHO=6,000 thus means 1,000 operating hours.

Figure 14:
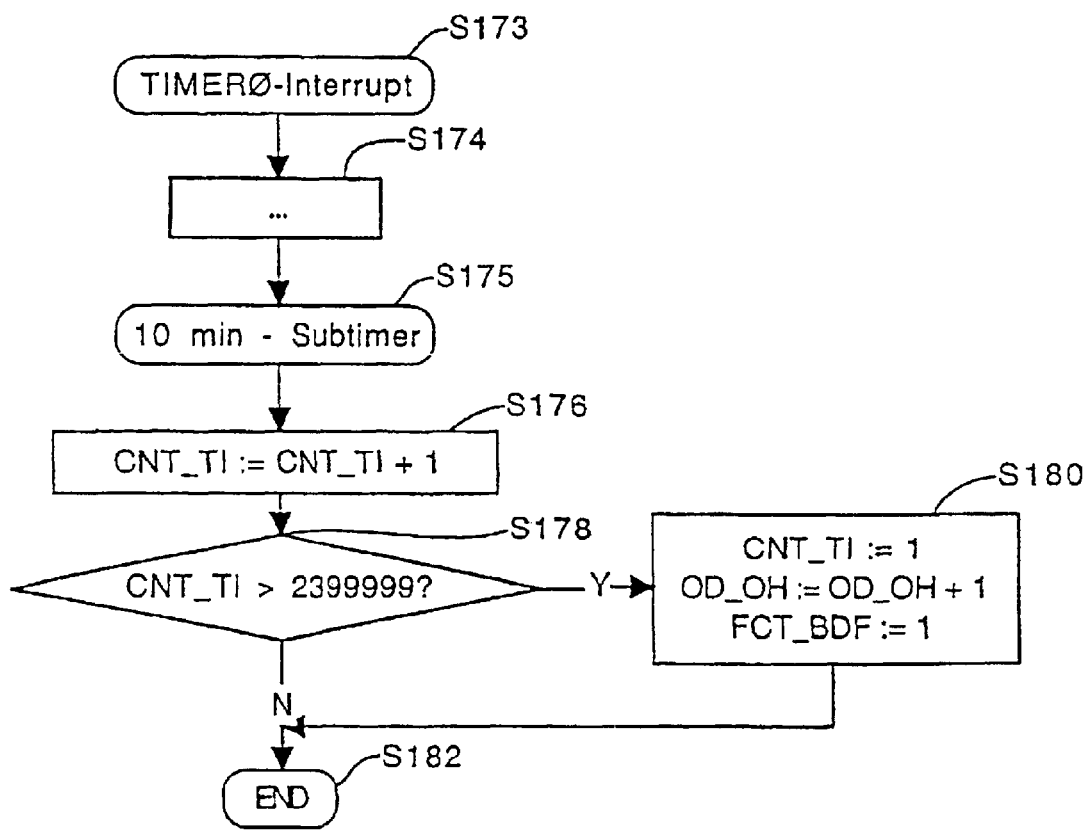
FIG. 14 is a flow chart of the "TIMER$\emptyset$ Interrupt" function of FIG. 6.

At startup, OD_OHO is loaded into RAM 97 and continuously updated therein by means of the routine shown in FIG. 14.

Every 10 minutes the updated value is written into EEPROM 74 together with other values, as explained with reference to FIG. 15.

OD_COMMUT is the total number of Hall interrupts 611 (FIG. 4). Since each Hall interrupt causes a commutation (cf. FIG. 13), this is an indication of the total number of revolutions of rotor 130.

The number of commutations is saved in units of 10,000, so a value of 200,000 indicates that 2 billion commutations have taken place. With a four-pole rotor 130 this corresponds to 500 million revolutions, and at a constant 3,000 rpm this would correspond to an operating time of approximately 2,800 hours. This figure provides information about the expected remaining service life of the bearings of motor 32.

Figure 13:
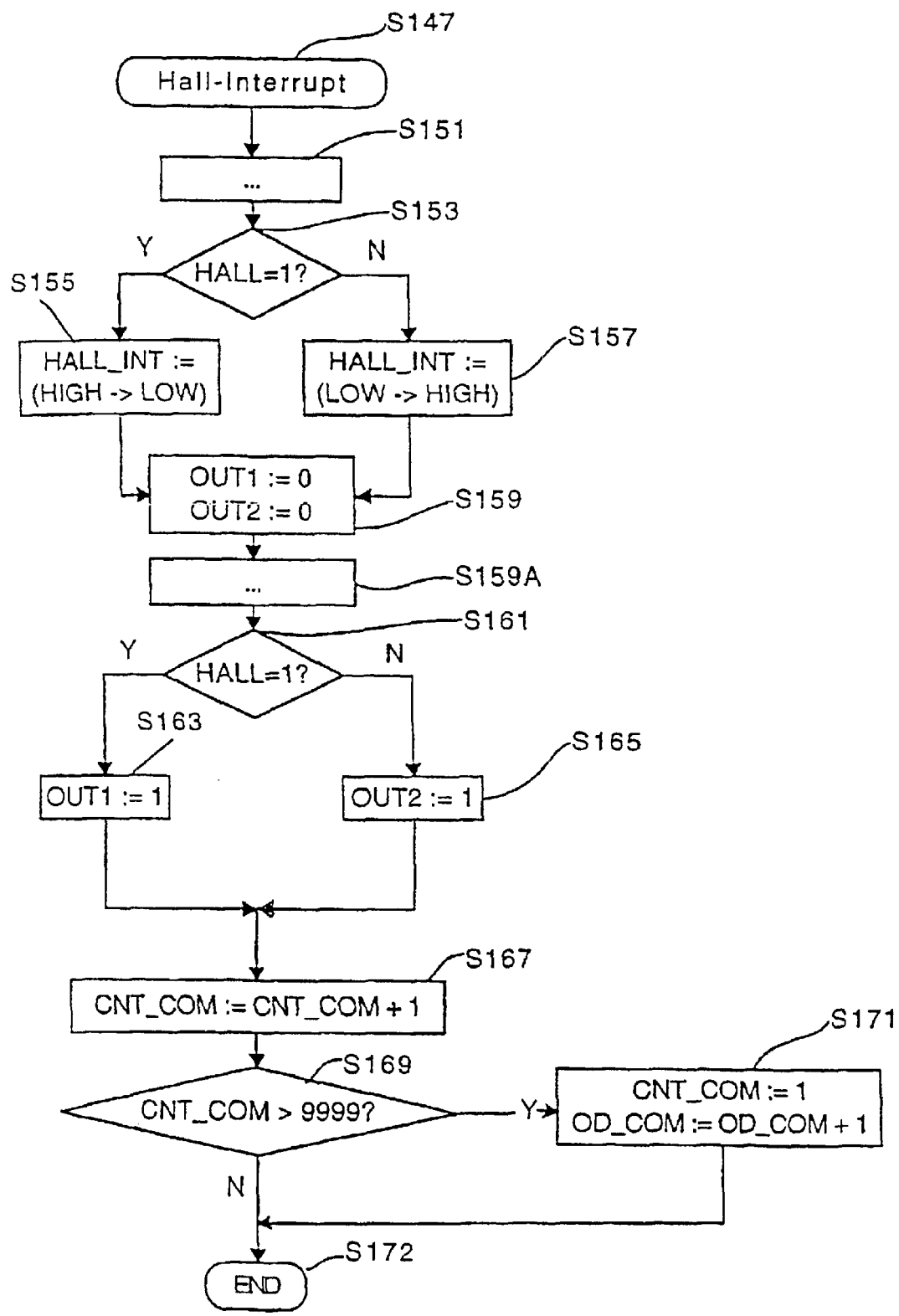
FIG. 13 is a flow chart of the "Hall Interrupt" function of FIG. 6.

At startup, OD_COMMUT is loaded into RAM 97 and is continuously updated therein by means of the routine shown in FIG. 13. Every 10 minutes the updated value is written into EEPROM 74 together with other values, as explained with reference to FIG. 15.

Figure 22:
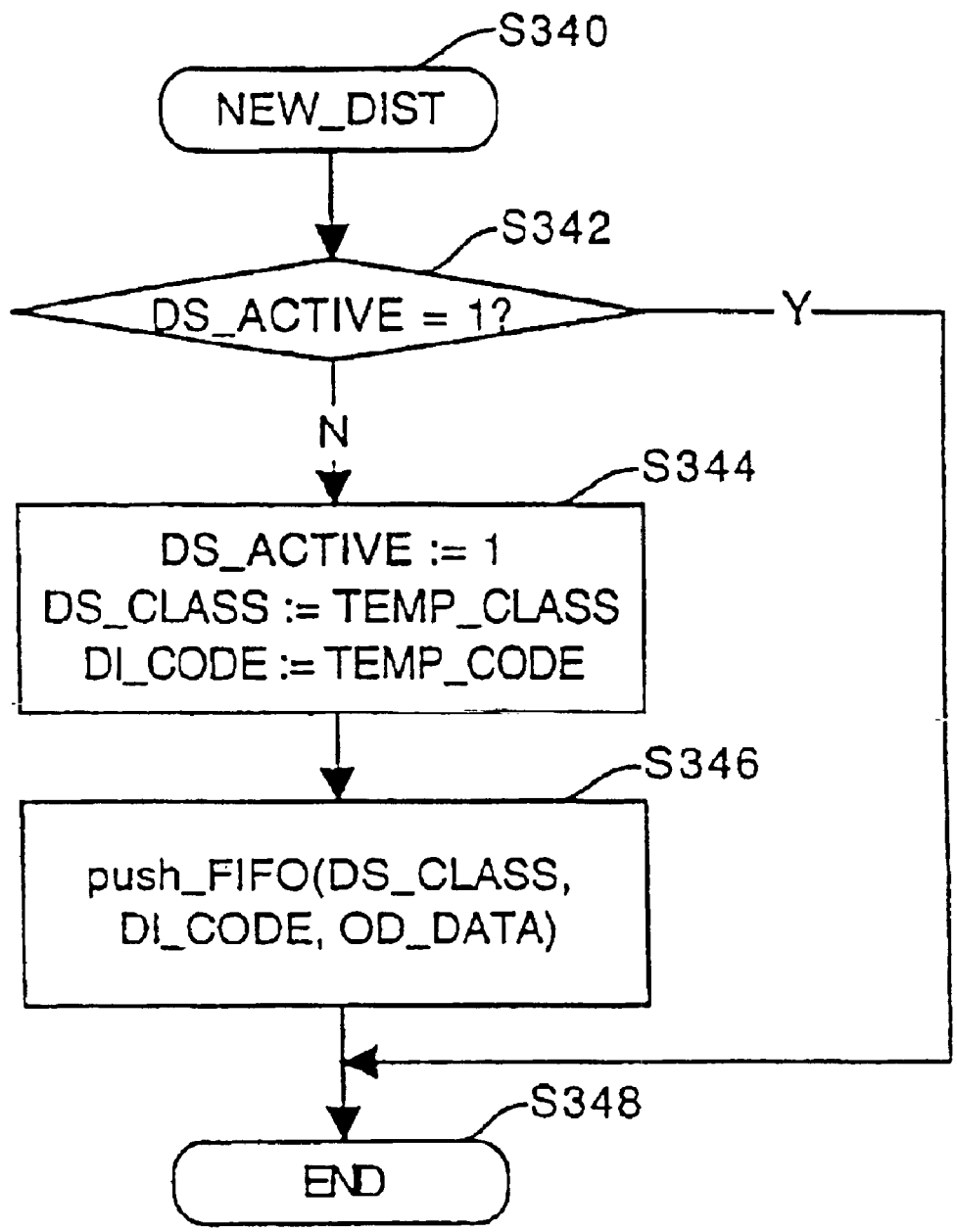
FIG. 22 is a flow chart of a "NEW_DIST" function which is called in the event of a new error.

Upon occurrence of an error, the present values (in RAM 97) of OD_TMAX, OD_UBMAX, OD_OHO, and OD_COMMUT are saved in a FIFO of EEPROM 74 (cf. FIG. 22, S346, push_OD_DATA).

Object table 111 (FIG. 8) thus contains a kind of "curriculum vitae" of motor 32; and by modifying the first four objects it is possible to define whether and how motor 32 reacts to an error, what is to be saved and how, where an alarm will be outputted, etc. In other words, corresponding parameters can be defined and entered into the motor.

Control Words and State Words

FIG. 9 shows a control word DI_CTRL, which has the same structure as object DIST_CTRL from object table 111 (FIG. 8) and which serves for data exchange between the operating system (FIG. 6) and the individual error functions. It is located in RAM 97, into which the value of DIST_CTRL (FIG. 8) is loaded in "INIT" S600 at the start of the main program after a reset of $\mu$C 23. The bits of DI_CTRL are serially numbered 0 through 7.

Bit 0 is named DC_LATCH. If DC_LATCH=NO_LATCH, i.e. LOW (0), an error is not saved, and the error state is reset after the error disappears. If DC_LATCH=LATCH, however, i.e. HIGH (1), an error state is not cleared until a request to do so comes via bus B2.

Bits 1 through 6 are not used here, and are reserved (RES) for future uses and enhancements.

Bit 7 is named DC_CLEAR, and is used to clear an error state. To do so, the value of DC_CLEAR, which is 0 in the base state, must be set to 1 and then back to 0, as indicated in FIG. 9.

FIG. 10 shows a state word DI_STATE, which corresponds to object DIST_STATE (FIG. 8) and is initialized in "INIT" S600 in the same way as DI_CTRL.

Bits 0 through 2 are named DS_CLASS, and DS_CLASS can assume the (decimal) values 0 through 7. DS_CLASS contains the error class. The error classes are defined as follows:

| | |
|---|---|
| DS_$\mu$C (0) | Error in $\mu$C 23 |
| DS_COMM (1) | Communication error |
| DS_SENS (2) | Error in the sensor or sensors, e.g. NTC resistor 62 |
| DS_HW (3) | Error elsewhere in the hardware. |

The remaining values 4 through 7 of DS_CLASS are not used (RES) in this exemplary embodiment.

Bits 3 through 6 are not used (RES).

Bit 7 is named DS_ACTIVE. If DS_ACTIVE=NO_DIST (0), no error is present and the content of DS_CLASS is irrelevant. If DS_ACTIVE=DIST (1), an error is present and DS_CLASS contains the error class.

FIG. 11 shows an error code DI_CODE which specifies the error more precisely. After each reset of $\mu$C 23, in S600 (FIG. 6) the value of object DIST_CODE (FIG. 8) is written to DI_CODE. DI_CODE is 16 bits long, and can therefore represent values from 0 to 65535. One thousand values are provided for each of the individual error classes (FIG. 10).

Values 0 through 999 are reserved for class DS_$\mu$C, i.e. for errors of $\mu$C 23. The error code definitions are as follows:

| | |
|---|---|
| DN_WDT | Error in a watchdog timer |
| DN_CHKS_ROM | Checksum error in ROM 96 |
| DN_CHKS_RAM | Checksum error in static portion 142 of RAM 97 |
| DN_CHKS_EEPROM | Checksum error in EEPROM 74 |
| DN_TEST_RAM | Error in internal RAM test of $\mu$C 23. |

Values 1000 through 1999 are reserved for class DS_COMM. The error code definitions are as follows:

| | |
|---|---|
| DN_TIMEOUT_TRANSFER | Time-out error during a transfer |
| DN_TIMEOUT_BUS | Time-out error during access to bus 82 |
| DN_PROT_ERR | Invalid transfer protocol (e.g. 9 data bits) |
| DN_INVAL_DATA | Invalid data |

Values 2000 through 2999 are reserved for class DS_SENSOR. The error code definitions are as follows:

| | |
|---|---|
| DN_SENSOR_INTERRUPT | Sensor interruption (interruption at point 62a or 62b of FIG. 2) |
| DN_SENSOR_SHORT | Sensor short circuit (between points 62a and 62b) |

Values 3000 through 3999 are reserved for class DS_HW (HW=hardware). The error code definitions are as follows:

DN_DRIVER_FAULT Error in output stage 112 (FIG. 2).

The remaining values are not defined here (RES).

FIG. 12 shows a reaction word DI_REAC which indicates the reaction that should occur in response to an error. DI_REAC corresponds to object DIST_REAC of FIG. 8 and, like DI_CTRL, it is written out from object table 111 in S600 (FIG. 6), along with the value of object DIST_REAC, after a reset of μC 23.

Bits 0 through 2 are named DR_REAC, and DR_REAC can assume (decimal) values of 0 through 7. DR_REAC contains the reaction by the error function in response to an error. The reactions are defined as follows:

| | |
|---|---|
| DR_OFF | No reaction |
| DR_n_max | Maximum rotation speed |
| DR_n_min | Minimum rotation speed |
| DR_n_0 | Zero rotation speed |
| DR_n_DIST | Specific error rotation speed |
| DR_BRAKE | Zero rotation speed and active braking of motor 32. |

Bit 3 is named DR_AL. If DR AL=DR_AL_OFF, no alarm is requested from alarm function 86 in the event of an error. If, on the other hand, DR_AL=DR_AL_ON, then an alarm is requested from alarm function 86 in the event of an error. Bits 4 through 7 are not used here (RES).

Hall Interrupt and Timerø Interrupt

FIG. 13 shows the portions essential in this context of a "Hall interrupt" routine S147 that is called upon occurrence of a Hall interrupt (611 in FIG. 6). A Hall interrupt 611 is triggered at each change in signal HALL (FIG. 4) from HIGH to LOW or from LOW to HIGH, i.e. at times t=0, 2.5, 5, 7.5, and 10 ms in the example of FIG. 4.

S151 is a general designation of steps that pertain to the calculation of HALL time t_H (FIG. 4), e.g. stopping a corresponding timer, etc.

In steps S153, S155, and S157, the edge of signal HALL at which the next Hall interrupt is to be triggered in μC 23 is set. For that purpose, S153 checks whether HALL=1. If Yes, in S155 the edge at which the next Hall interrupt is to be triggered is set to a trailing edge (HIGH→LOW). If No, then in S157 the resolution is set to a leading edge (LOW→HIGH).

In S159, OUT1 and OUT2 are set to zero, i.e. motor 32 is made currentless. The purpose of this is to interrupt H-bridge 112 briefly so that a short circuit cannot occur in it during a commutation.

A variety of steps can be performed in S159A, e.g. restarting of a counter (not depicted) for the measurement of t_H. These program steps should last, for example, 50 microseconds.

In S161 through S165, commutation is performed. If HALL=1 in S161, then in S163 OUT1 is set to 1 while OUT2 remains at 0 (cf. S159). If HALL=0 in S161, then in S165 OUT2 is set to 1 while OUT1 remains at 0 (cf. S159).

The signal OUT1=1 causes transistors 114 and 118 to be switched on, as already described; and the signal 0UT2=1 causes transistors 116 and 120 to be switched on.

Steps S167 through S171 represent a counter with which a counter OD_COM, which is loaded after each reset of μC 23 in S600 (FIG. 6) with the value of object OD_COMMUT from object table 111, is incremented by 1 e.g. every 10,000 commutations.

To achieve this, in S167 a counter CNT_COM is incremented by 1 at each Hall interrupt. S169 checks whether CNT_COM>9999. If Yes, then in S171 CNT_COM is set to 1, and counter OD_COM is incremented by 1. If CNT_COM is not greater than 9999 in S169, execution then branches directly to the end at S172.

The number of commutations is required in FIG. 6 for the "operating data function" S638 and "error function" S640.

FIG. 14 shows a portion of "TIMERø interrupt" routine S173, which is labeled 615 in FIG. 6. Every 256 microseconds, for example, timer TIMERø triggers a TIMERø interrupt. TIMERø can therefore be used for time measurements.

Step S174 represents any other applications of timer 98 that are not depicted here.

Steps S175 through S180 represent a subtimer that executes a step S180, for example, every 10 minutes. A timer CNT_TI, which is incremented by 1 at each TIMERø interrupt in S176, is used for this purpose. S178 checks whether CNT_TI>2,399,999. If Yes, execution branches to S180; otherwise it branches to the end S182. If CNT_TI has reached a value of 2,400,000, this means that 256 microseconds have elapsed 2,400,000 times. This corresponds to exactly 10 minutes. CNT_TI is then reset back to 1 in S180. An "operating hour counter" OD_OH in RAM 97, to which the value of object OD_OHO is written from EEPROM 74 after each reset of μC 23, is incremented by 1; and bit FCT_BDF of function register 605 of FIG. 6 is set, so that "operating data function" S638 is called by function manager 601 (cf. FIG. 6) in order to load specific operating data values into EEPROM 74.

"Operating hour counter" OD_OH in RAM 97 therefore contains, in this case, the total operating time of the fan in units of 10 minutes, as does operating hour counter OD_OHO in EEPROM 74.

Figure 15:
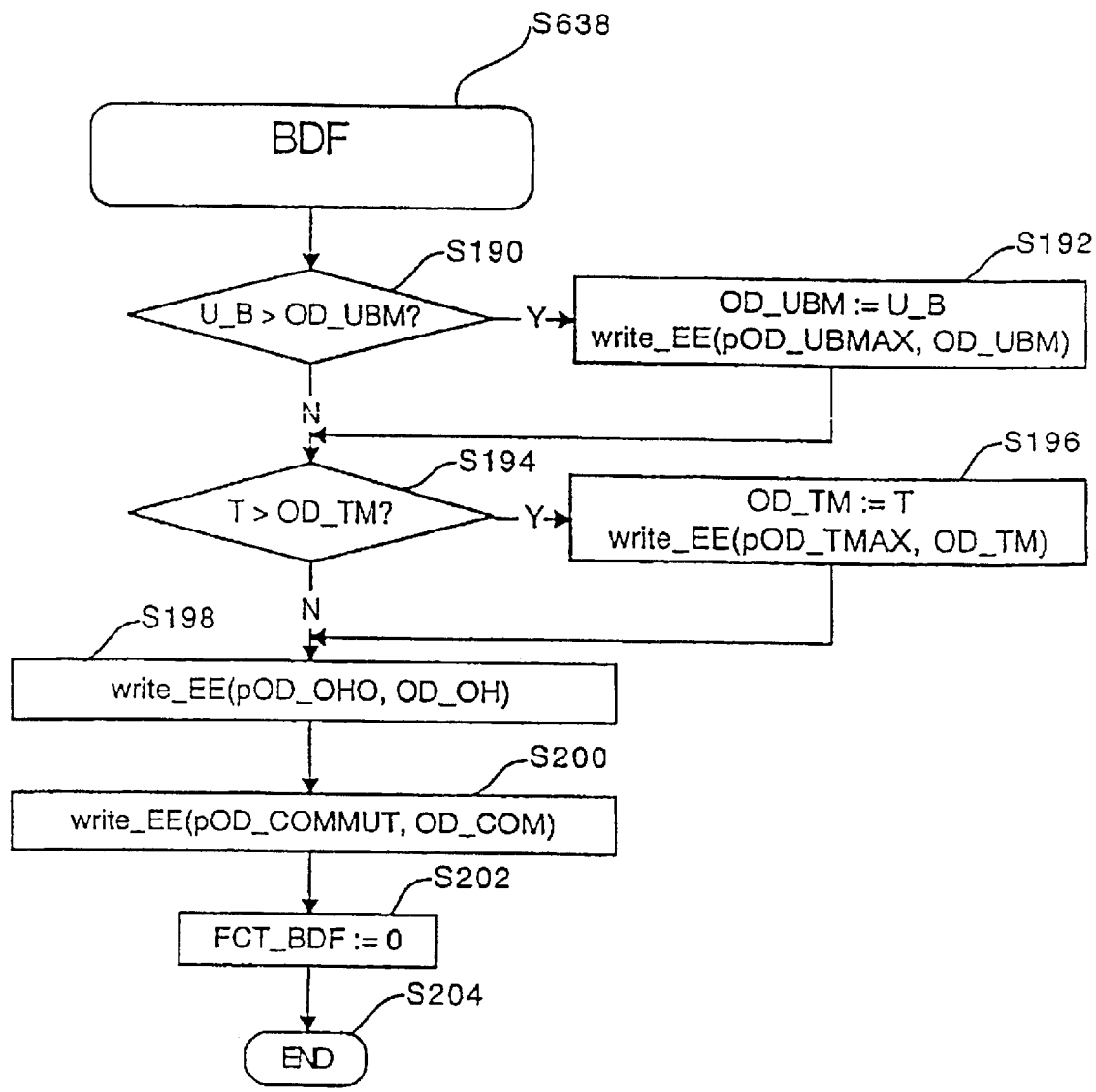
FIG. 15 is a flow chart of the "Operating Data Function" of FIG. 6.

Operating Data Function BDF (FIG. 15)

FIG. 15 shows "operating data function" S638 (FIG. 6), which is called when function manager 601 (FIG. 6) reaches step S636 and bit FCT_BDF of function register 605 (FIG. 7) has been set, for example by the subtimer in "TIMERø interrupt" routine S170 (FIG. 14). In the present exemplary embodiment, this happens every 10 minutes.

"Operating data function" S638 serves to save important operating data values (e.g. maximum fan temperature or operating hours) in EEPROM 74, for example in order to obtain a criterion for replacement of the fan. These data can then be read out of EEPROM 74 and furnish a kind of "health bulletin" about motor 32.

"Disease bulletins" about motor 32 can additionally be saved in a FIFO (First In/First Out) of EEPROM 74 if such "diseases" occur. These disease bulletins can also be read out of the EEPROM later, and furnish a kind of log of the error that occurred and, optionally, its cause, e.g. excessive temperature, overvoltage, or end of service life.

In this embodiment of operating data function BDF, S190 checks whether the present operating voltage U_B which was digitized by A/D converter 60 is greater than the previous highest operating voltage OD_UBM. If Yes, in S192 U_B is assigned to the value OD_UBM, and object OD_UBMAX, which in this exemplary embodiment is located at point pOD_UBMAX in EEPROM 74, is set to the new value OD_UBM using the instruction write_EE. The point at which an object is located in EEPROM 74 (cf. FIG. 8) is designated by a "p" prefix. For example, pOD_UBMAX is the point in EEPROM 74 at which object OD_UBMAX is located (cf. FIG. 8). The maximum operating voltage UBMAX is important because too high an operating voltage accelerates wear on the electronic components. It would similarly be possible to retain a minimum operating voltage (undervoltage).

S194 checks whether the present temperature T, which is measured with sensor 152, is greater than the previous maximum temperature OD_TM. If Yes, then in S196 the new maximum temperature is assigned to the previous maximum temperature OD_TM, and object OD_TMAX in object table 111 (FIG. 8) is, by analogy with S192, overwritten with the new maximum value OD_TM using the instruction write_EE. (The parameter pOD_MAX once again indicates the point in EEPROM 74 at which object OD_TMAX is saved.)

In S198, the present operating hours located in OD_OH are written, using the instruction write_EE, into object OD_OHO (FIG. 8) of EEPROM 74, so that they are retained even when fan 32 is switched off. The measurement of operating hours OD_OH is explained with reference to FIG. 14.

In S200 the present number of commutations, which is saved in OD_COM, is written into object OD_COMMUT (FIG. 8) using the instruction write_EE. Measurement of the number of commutations is explained with reference to FIG. 13.

In S202, request bit FCT_BDF is reset to zero since "operating data function" S638 is completely executed, and function S638 ends at S204.

Error Detection

Figure 16:
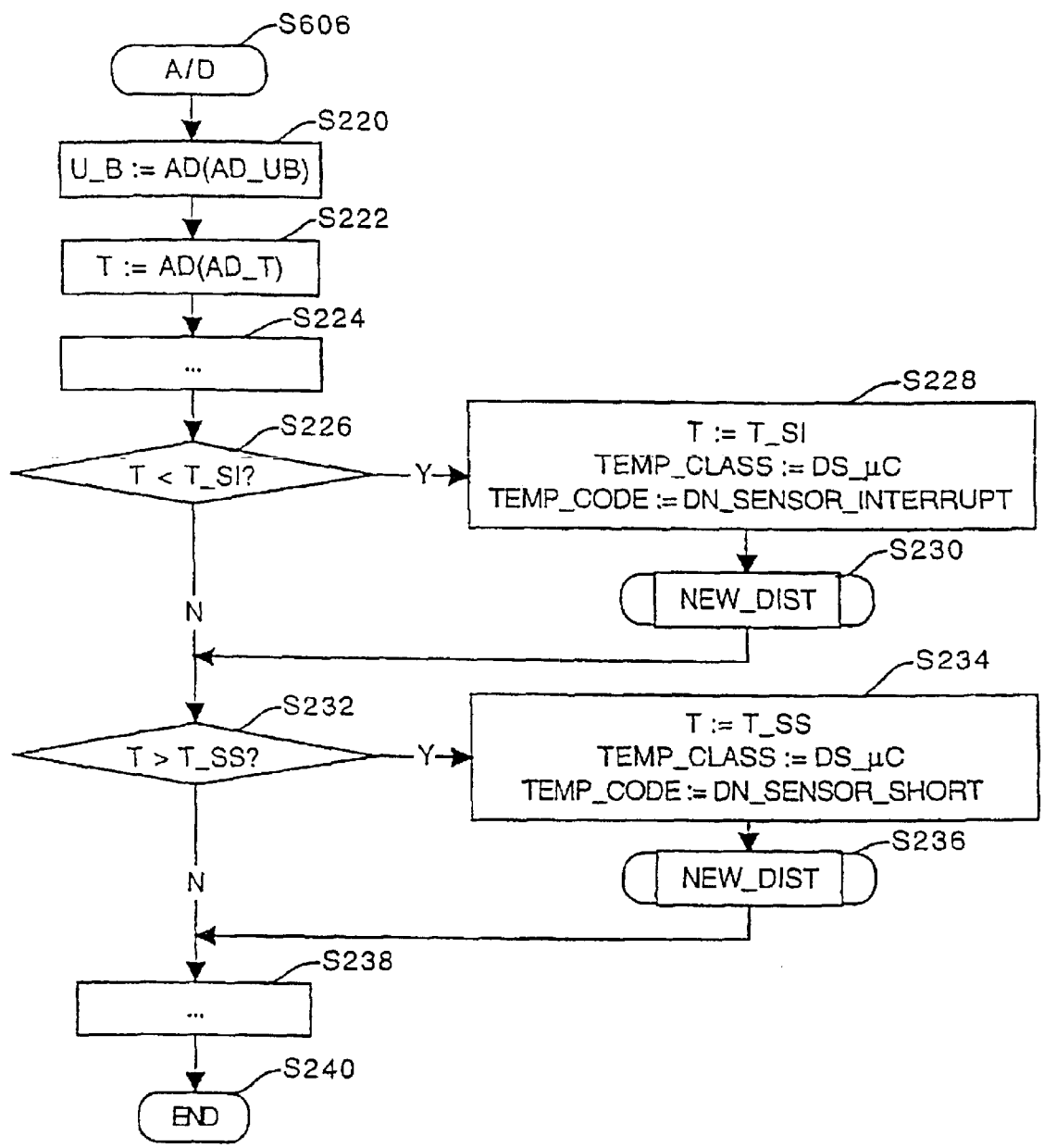
FIG. 16 is a flow chart of the "A/D" function of FIG. 6.

FIG. 16 shows a flow chart with a portion of "A/D" function S606 (FIG. 6).

In S220, the potential at input 57 of A/D converter 60 (FIG. 2) is read in using the instruction AD(AD_UB), and is saved in U_B. The value U_B corresponds to the present operating voltage UB, e.g. 40 V.

In S222, the potential at input 67 of A/D converter 60 (FIG. 6) is read in using the instruction AD(AD_T), and is saved in T. The value T corresponds to a present temperature at NTC resistor 62, e.g. 84° C.

Any further steps, for example a request for "characteristic function" S622, are performed in S224.

S226 checks whether a sensor interruption is present, i.e. whether the connection to NTC resistor 62 is interrupted at point 62a or 62b. This is the case if the value for T is less than a sensor interruption value T_SI. If so, at S228 temperature value T is set to T_SI, and the program prepares to call a NEW_DIST function which is explained with reference to FIG. 22. For this purpose, error class DS_$\mu$C and error code DN_SENSOR_INTERRUPT for the sensor short-circuit error are saved into variables TEMP_CLASS and TEMP_CODE, respectively, and NEW_DIST (FIG. 22) is called in S230.

S232 checks analogously for a sensor short circuit, i.e. a short circuit between points 62a and 62b in FIG. 2. This is done by determining whether value T is greater than a sensor short-circuit value T_SS. If Yes, then in S234 value T is set to sensor short-circuit value T_SS, variables TEMP_CLASS and TEMP_CODE are set to the values for a sensor short circuit, and NEW_DIST (FIG. 22) is called in S236.

Further steps follow, if applicable, in S238. The A/D routine ends at S240.

Instead of or in addition to operating voltage U_B, a different voltage, e.g. a 12V auxiliary voltage being used, could also be measured in order to save its extreme value.

Figure 17:
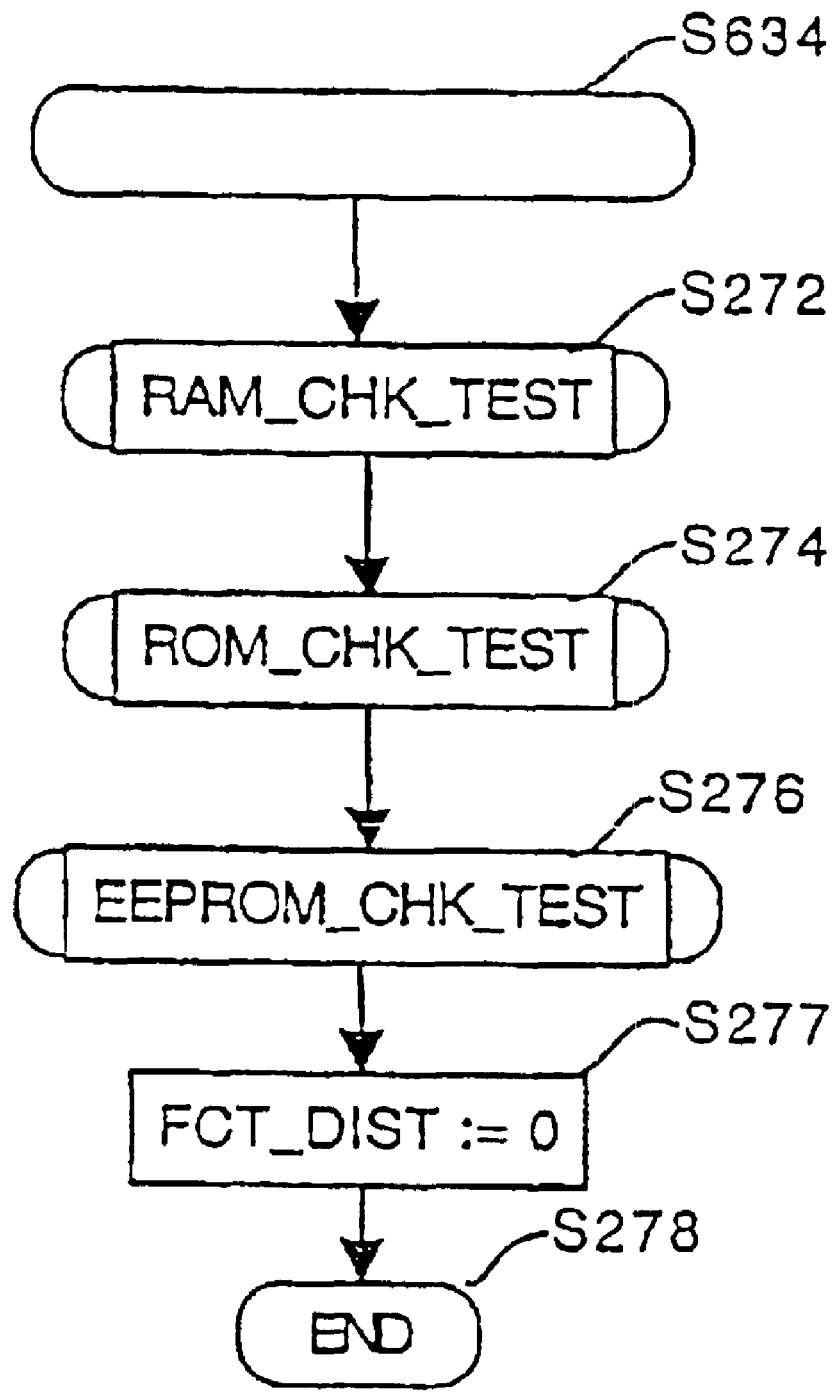
FIG. 17 is a flow chart of the "Error Detection" function of FIG. 6.

FIG. 17 is a flow chart of "error detection" function S634 (FIG. 6). This is a requestable function that must be requested using request bit FCT_DIST=1. It is requested upon initialization (S600 in FIG. 6) after the motor is switched on, and thereafter approximately every 100 ms by a timing member, e.g. a counter controlled by TIMERS. The effect of the error detection function is therefore that the memories are checked every 100 ms.

In S272 a "RAM_CHK_TEST" function is performed, in S274 a "ROM_CHK_TEST" function, and in S276 an "EEPROM_CHK_TEST" function. These functions check whether an error has occurred in RAM 97, ROM 96, or EEPROM 74. It is possible, for example, for a bit in RAM 97 to "flip"; this can lead to errors in the program of $\mu$C 23 and thus to unreliable operation of fan 32.

In S277, request bit FCT_DIST is reset to zero since "error detection" function S634 has been completely executed.

The memory tests will be explained with reference to the subsequent Figures, using the example of the "RAM CHK_TEST" function for testing RAM 97. The tests for EEPROM 74 and ROM 96 proceed in entirely analogous fashion.

Figure 18:
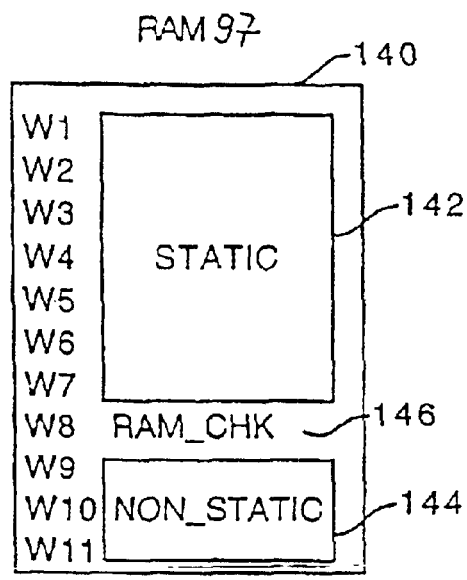
FIG. 18 depicts a RAM region of $\mu$C 23 of FIG. 2.

FIG. 18 shows a region 140 of RAM 97, which in this case is divided into a static region "STATIC" 142 and a non-static (dynamic) region "NON_STATIC".

For illustration, memory words W1 through W11 are sequentially numbered. Region "STATIC" 142 comprises memory words W1 through W7. Memory word W8 contains variable RAM_CHK 146 which serves to check region "STATIC" 142. Region "STATIC" 142 contains, for example, functions and constants. Region "NON_STATIC" 144 comprises memory words W9 through W11 and contains, for example, variables.

Figure 19:
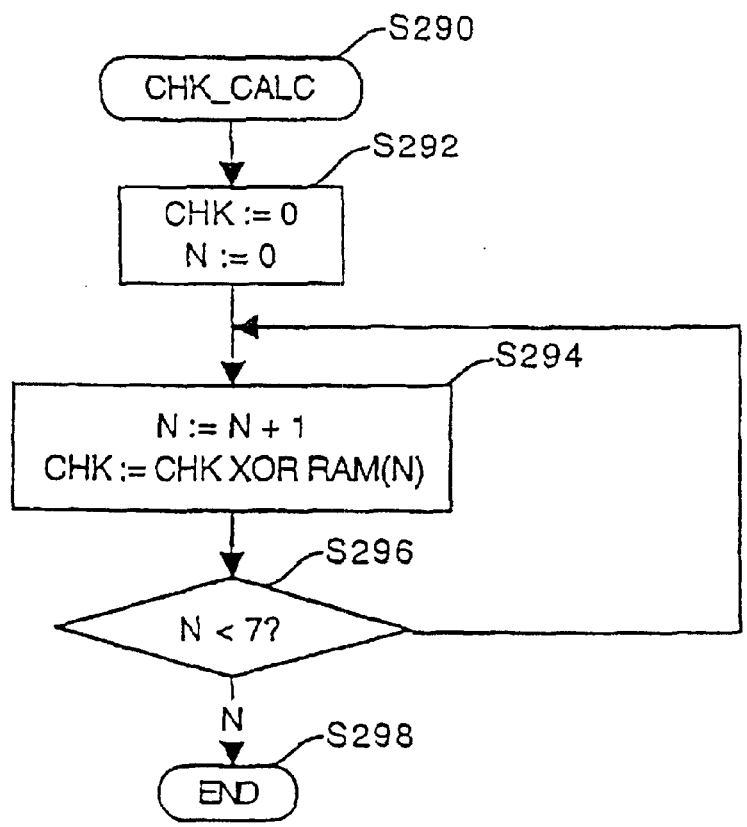
FIG. 19 is a flow chart of a "CHK_CALC" function for calculating a check value for memory checking.

FIG. 19 shows a "CHK_CALC" function S290 which serves to calculate a check value CHK. For this, in S292 CHK is set to zero and a loop counter N is also set to zero.

A loop begins in S294. N is incremented by 1 each time, and an XOR operation on CHK and RAM(N) is performed. RAM(N) is the memory word in RAM region 140 (FIG. 18) at point WN. S296 checks whether N<7. If No, this means an XOR of CHK with memory words W1 through W7, and thus with all the memory words in region "STATIC" 142, has been made, and the routine goes to step S298 (END).

Figure 20:
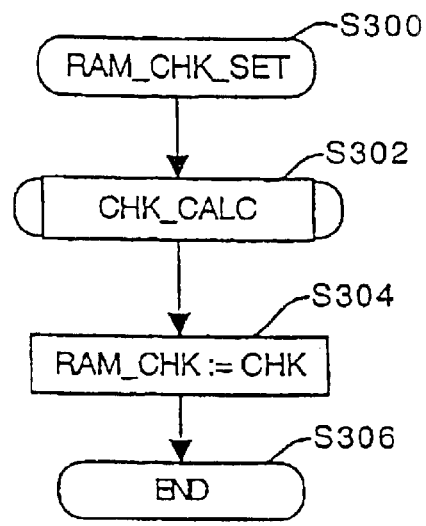
FIG. 20 is a flow chart of a "RAM_CHK_SET" function which serves to calculate a check value RAM_CHK and save it at a predetermined point in a RAM region.

FIG. 20 is a flow chart of "RAM CHK_SET" function S300 which is used to set RAM_CHK 146 (FIG. 18).

The "CHK_CALC" function (FIG. 19), which calculates check value CHK, is called in S302. In S304 this value is saved in RAM_CHK 146 (FIG. 18), i.e. in word W8 of RAM region 140. The routine ends at S306.

The "RAM_CHK_SET" function is called, for example, after each reset of $\mu$C 23 in S600 (FIG. 6). If a memory word in region "STATIC" 142 (FIG. 18) is deliberately modified during the runtime, "RAM_CHK_SET" S300 must be called again. In ROM 96, a corresponding ROM_CHK check word is calculated and entered before ROM 96 is "burned."

Figure 21:
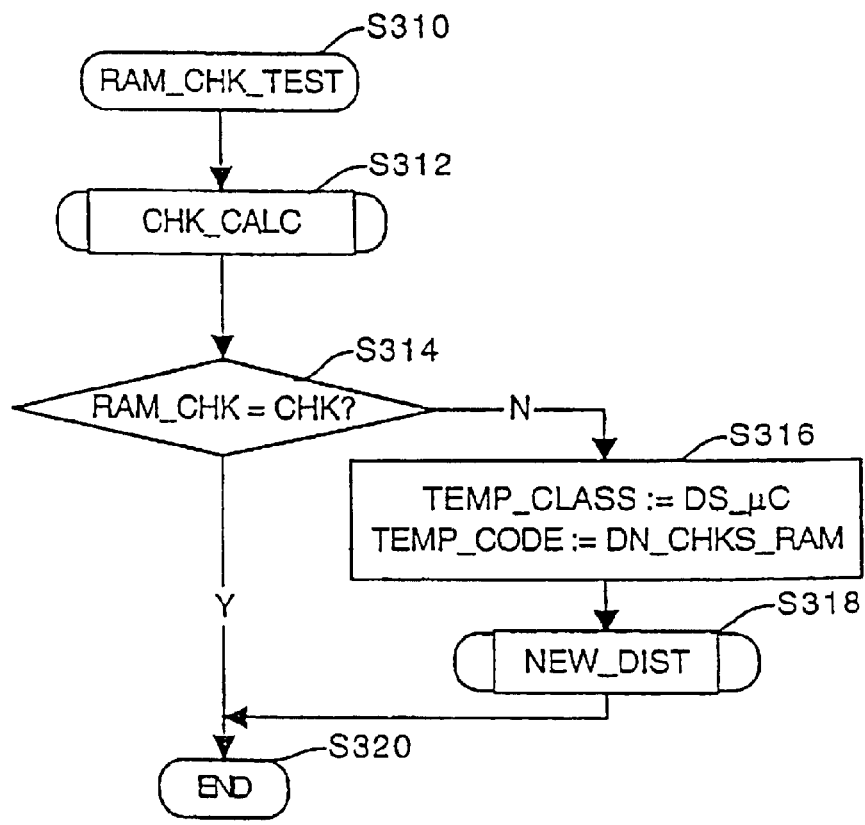
FIG. 21 is a flow chart of the "RAM_CHK_TEST" function of FIG. 17, which serves for memory checking.

FIG. 21 is a flow chart of the "RAM_CHK_TEST" function (S272 in FIG. 17). In S312, the "CHK_CALC" function (5290 in FIG. 19) is called again, and check value CHK is calculated.

In S314, CHK is compared to the saved value RAM_CHK 146 (FIG. 18). If the two values are not equal, an error has occurred in region "STATIC" 142, and execution branches to S316. In S316, variable TEMP_CLASS is loaded with DS_GC and variable TEMP_CODE is loaded with DN_CHKS_RAM, and in S318 the "NEW_DIST" function (FIG. 22) is called. If the values RAM CHK and CHK are identical in S314, the routine branches directly to S320 (END).

The memory checks of ROM 96 and EEPROM 74 proceed analogously. Instead of the XOR procedure it is also possible to use, for example, a checksum method or another check method, e.g. CRC (cyclic redundancy check).

FIG. 22 is a flow chart of "NEW_DIST" function S340 which is called each time an error is detected.

S342 checks whether state word bit DS_ACTIVE=1 (cf. FIG. 10). If Yes, then an error is already present; execution branches to the end S348 and the new error is ignored. The reason for this is that one error can lead to consequential errors; the first, oldest error is therefore the most important for analysis.

If S342 finds that a new error is present (DS_ACTIVE=0), execution then branches to S344. In S344 DS_ACTIVE (FIG. 10) is set to 1, and error class DS_CLASS and error code DI_CODE are set to the respective values TEMP_CLASS and TEMP_CODE set by the calling function. FIG. 21 shows, for example, that TEMP CLASS has been set to DS_$\mu$C.

In S346, error class DS CLASS, error code DI_CODE, and the present operating data OD_DATA are saved, by means of an instruction push_FIFO, in a FIFO in EEPROM 74. OD_DATA can contain, for example, the present temperature, present operating hours, present number of commutations, error class, error code, and—if a real-time clock 149 (FIG. 1) is present —the present time of day and date.

Processor 23 then sets a state signal that is continuously checked by a PC 81 connected thereto and causes the latter to call the saved data regarding errors. If motor 32 is stationary as a result of the errors, e.g. because its rotor 130 is jammed, PC 81 can switch on a reserve motor (not depicted), or an alarm is triggered. If motor 32 is a fan, PC 81 can switch another fan to a higher rotation speed so that cooling continues to be guaranteed.

Error Function (Error Monitoring Routine)

FIG. 23 shows a flow chart of error function S640 (FIG. 6), which can also be referred to as the error monitoring routine.

S362 checks or monitors, on the basis of DS_ACTIVE (FIG. 10), whether an error is present. If DS_ACTIVE=0, no error is present; and execution branches to the end (S390).

If DS_ACTIVE=1, an error is present, and a reaction that is determined by value VAL of DR_REAC (FIG. 12) is implemented.

If DR_REAC=DR_OFF, execution branches from S364 directly to S386, and no reaction occurs.

If DR_REAC=DR_n_max, execution branches from S366 to S368. In S368, n_const is set to 1 and "rotation speed calculation" function S626 (FIG. 6) is thereby informed that a constant rotation speed is now defined. In addition, rotation speed target value n_s is set to a maximum rotation speed n_max, pulse duty factor PWM_TV of pulses 107A (FIG. 2) being set to 100%.

If DR_REAC=DR_n_min in S370, then in S372 n_const is set to 1 and rotation speed target value n_s is set to a minimum rotation speed n_min. This rotation speed is then specified to controller 70 as the rotation speed target value.

If DR_REAC=DR_n_0 in S374, then in S376 n_const is set to 1 and rotation speed target value n_s is set to 0. For this purpose, transistors 114, 116, 118, 120 in FIG. 2 are made nonconductive so that motor 32 no longer receives current.

If DR_REAC=DR_n_DIST in S378, then in S380 n_const is set to 1 and rotation speed target value n_s is set to error rotation speed n_DIST which is defined by object n_DIST (FIG. 8). This rotation speed n_DIST is then conveyed to controller 70 as rotation speed target value n_s.

If DR_REAC=DR_BRAKE in S382, then in S384 n_const is set to 1, rotation speed target value n_s is set to 0, and BRAKE is set to 1 in order to indicate to "RGL" function S610 (FIG. 6) that active braking is required. In this situation, for example, the two lower transistors 118, 120 of H-bridge 112 (FIG. 2) are made continuously conductive so that stator winding 128 is short-circuited, while upper transistors 114, 116 are opened.

After DR_REAC has been checked in S364 through S382, S386 checks on the basis of DR_AL (FIG. 12) whether an alarm is to be triggered in the event of an error.

If DR_AL=DR_AL_ON, then in S388 state word AS_DIST is set to 1, thereby informing alarm function S642 (FIG. 6) that an error is present and an alarm is to be triggered. The routine then branches to S390 (END).

Figure 24:
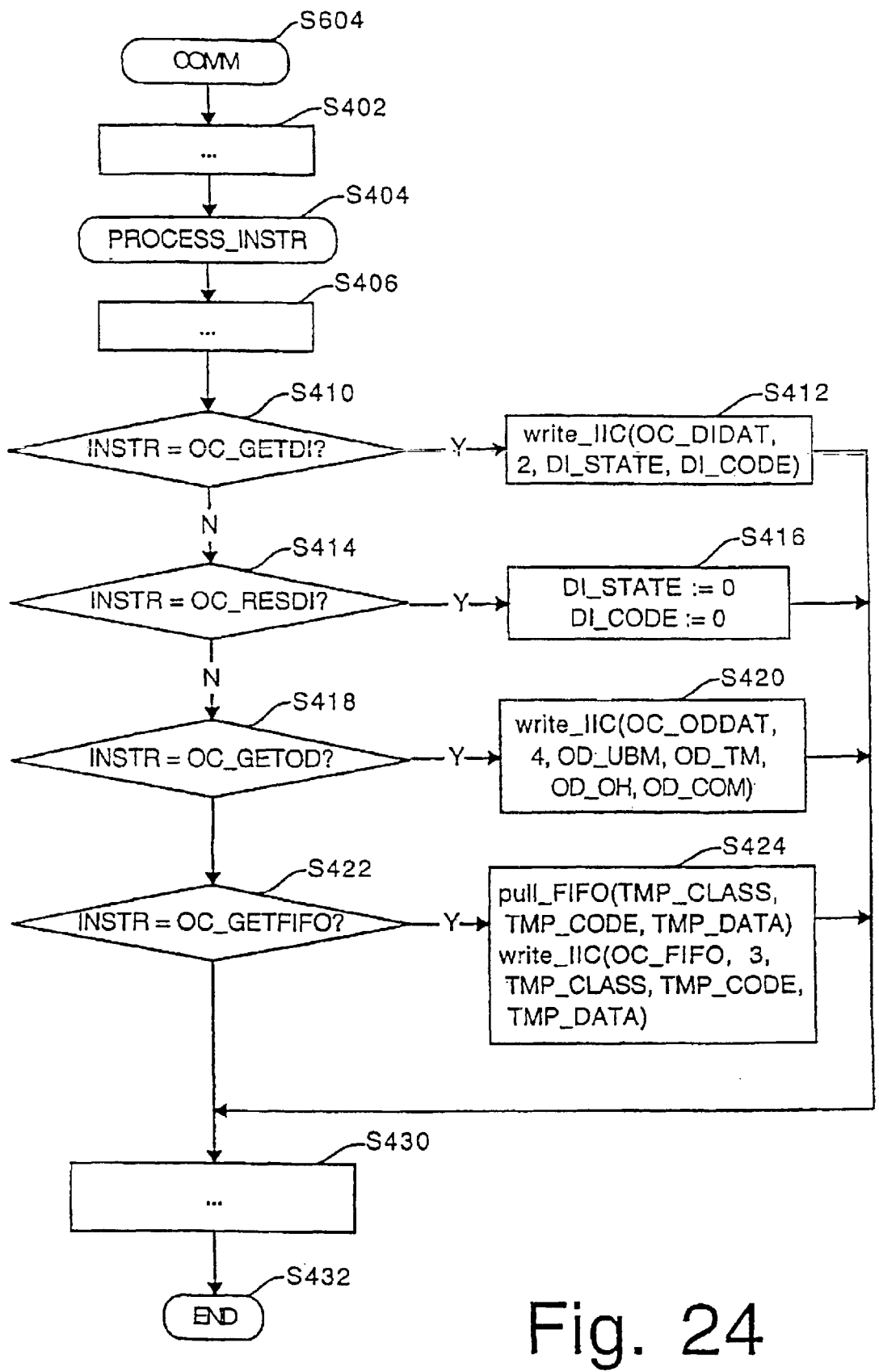
FIG. 24 is a flow chart of the "COMM" routine of FIG. 6.

Communication Function (FIG. 24)

FIG. 24 is a flow chart of "COMM" function S604 (FIG. 6). It controls input and output via bus 82. (Steps S402, S406, and S430 symbolize possible further program sections; i.e. in order to avoid unnecessary length, FIG. 24 usually represents only the portion of "COMM" function S604 that is important here.)

S404 is the beginning of portion PROCESS_INSTR, in which instructions which the "COMM" function has received via a serial bus 82 (here an IIC bus), and which are located in INSTR, are executed.

The defined instructions begin with OC. OC_GETDI means, for example, that state word DI_STATE (FIG. 10) and error code DI_CODE (FIG. 11) are polled from outside. S410 checks whether INSTR=OC_GETDI. If Yes, the desired information is outputted onto IIC bus 82 using the instruction write_IIC. OC_DIDAT means that these are error data, and "2" means that two further arguments follow, namely DI_STATE and DI_CODE.

S414 is a comparison to determine whether INSTR=OC_RESDI; if so, execution branches to S416. OC_RESDI means that a reset of the error function must take place. Any errors saved in DI_STATE, DI_CODE must therefore be cleared. In S416, DI_STATE and DI_CODE are reset. DS_CLASS and DS_ACTIVE are reset simultaneously with DI_STATE (FIG. 10).

S418 checks whether INSTR=OC_GETOD; if so, execution branches to S420. OC_GETOD means that the operating data of the "operating data function" (FIG. 15) are retrieved via bus 82. In S420, the instruction write_IIC is used to write the operating data onto IIC bus 82. OC_ODDAT means here that these are data of the "operating data function" (FIG. 15); and "4" means that four further arguments follow, namely OD_UBM, OD_TM, OD_OH, and OD_COM (cf. FIG. 15).

In S422, INSTR is compared to OC_GETFIFO; if they are identical, execution branches to S424. OC_GETFIFO means that the next values are read out from the FIFO, which at each new error is filled with the error class, error code, and present operating data (FIG. 22). To achieve this, in S424 the next data are fetched from the FIFO and written into variables TMP_CLASS, TMP_CODE, and TMP_DATA. These data are then written onto bus 82 using write_IIC. OC_FIFO here indicates that these are data from the FIFO; and "3" indicates the number of additional parameters: TMP_CLASS, TMP_CODE, and TMP_DATA. S430 indicates possible further steps, and the COMM routine (which has a high priority of L3 as shown in FIG. 3) ends at S432.

In the present invention, therefore, a plurality of routines of different priorities (FIG. 6: L1 through L23) are provided, and if an error is identified as they are being executed, "emergency actions" are taken first. For example, if it is found at S226 in the A/D routine of FIG. 16 that an interruption exists in the line to sensor 152, then first of all, at S228, the corresponding error class and error code are saved, and then program NEW_DIST of FIG. 22 is executed. If another error is not already present, DS_ACTIVE is set therein. The error class and error code are saved in nonvolatile memory 74 in order to have permanent information about the nature of the error; similarly, all relevant operating data are saved in memory 74. The routine of FIG. 16 then initially continues to execute.

At some point, the program in FIG. 6 then arrives at error function S640, which is depicted in FIG. 23.

The error function determines that DS_ACTIVE is set; and in accordance with the parameters in word DIST_REAC of object table 111 (these parameters are also located in RAM 97 while the motor is operating), a reaction to the error is then implemented. These parameters are depicted in FIG. 12. In the context of a fan, DR_REAC (FIG. 12) will usually have the value 1, i.e. in the event of an error in temperature sensor 152, the rotation speed of motor 32 is set to the maximum value in order to ensure reliable ventilation. This occurs in steps S366 and S368 of FIG. 23. Thus as soon as the connection to sensor 152 is interrupted, motor 32 is very quickly switched over to its maximum rotation speed.

If this is not desired, for example because the fan then becomes very loud, it is possible to save a specific rotation speed, e.g. 2500 rpm, in value n_DIST of object table 111; the value selected for DR_REAC in FIG. 12 is then "4", i.e. DR_n_DIST. In the event of an error the error function (FIG. 23) then goes to steps S378 and S380 and switches motor 32, when an error is detected, to a constant rotation speed of 2500 rpm. This rotation speed can be selected without restriction when the motor is parameterized, and can also be modified later if the user has suitable software.

In FIG. 12 it is similarly possible to define, by means of variable DR_AL, whether or not an alarm is to be outputted. If DR_AL has a value of 1 in this context, an alarm will be triggered by steps S386 and S388 of FIG. 23.

A motor can therefore easily be parameterized as to whether and how it will react if an error is identified. In any event, EEPROM 74 will have saved data containing the error class, error code, and relevant motor data at the moment of the error, for example operating hours, maximum operating voltage, maximum temperature, optionally the time of day and date, etc., thus making it much easier, or indeed possible at all, subsequently to analyze an error that has occurred.

The procedure upon occurrence of an error can be compared to the care given to an accident victim: First comes the paramedic, who applies a temporary bandage and writes down some brief information that is attached to the patient as a label. This corresponds to identification of the error and saving of the operating data, for example in the A/D routine (FIG. 16) or the error detection routine(FIG. 17). Then the paramedic sets flag DS_ACTIVE=1, and leaves the victim until an ambulance arrives.

The error function program (FIG. 23), i.e. the error monitoring routine, corresponds to the ambulance. It drives past at some time, recognizes the victim from flag DS_ACTIVE=picks him up, and treats him in accordance with the saved instructions.

A system of this kind is very open and can be expanded and modified in any direction, since modifications affect not the program but only the data in object table 111 (FIG. 8). In every situation, the paramedic arrives first and performs predetermined actions; then the ambulance arrives and also performs predetermined actions. And those predetermined actions can be parameterized in memory 74.

Another advantage of the invention is that on the basis of objective data, a decision can be made as to whether a motor has reached the end of its service life and should be replaced as a precaution.

Many modifications and variants are, of course, possible within the scope of the present invention.

What is claimed is:

1. In combination, an electric motor having a controlling microprocessor and a nonvolatile memory and a program adapted to run in said microprocessor, which comprises:
   an error function which executes in the event of an error;
   and an arrangement, controlled by the error function, which, upon occurrence of an error, saves, in the nonvolatile memory, operating data of the motor, an error class which approximately specifies the type of error that occurred, and an error code which more narrowly specifies the type of errors, and wherein, upon occurrence of two errors within a predetermined short period of time, said arrangement saves only data associated with the chronologically older one of said two error.

2. The combination according to claim 1, which additionally comprises a data connection that enables access to operating data saved in the nonvolatile memory.

3. The combination according to claim 1, wherein said controlling microprocessor controls electronic commutation of said motor.

4. The combination according to claim 3, further comprising means for continuously counting commutation operations and for saving, in the nonvolatile memory, a variable corresponding to a value of commutations counted.

5. The combination of claim 1, further comprising means for continuously measuring a duration of operation and for savings, in the nonvolatile memory, a variable corresponding to said duration measured.

6. The combination according to claim 1, wherein the electric motor is an electronically commutated motor, and wherein the microprocessor controls the electronic commutation of the motor.

7. The combination according to claim 1, wherein the microprocessor is adapted to retrieve, from the nonvolatile memory, data which specify how an error is to be processed by the microprocessor.

8. A method of operating an electronically commutated motor (ECM) having associated therewith a microprocessor and a nonvolatile memory, the microprocessor serving to execute a plurality of routines having different respective priorities, comprising the step of:
   a) if an error is identified upon execution of a routine, setting an error signal, and saying predetermined specific data;
   b) running an error monitoring routine which checks at intervals of time as to whether the error signal is set; and
   c) if the error signal is set, controlling the motor in accordance with previously saved data and with at least one parameter that is saved in the nonvolatile memory, and
   further comprising, when two errors are present simultaneously, saving only data associated with the chronologically older one of said two errors.

9. The method according to claim 8, further comprising saving, as an operating data value, an instantaneous value of the motor operating voltage.

10. The method according to claim 8, further comprising saving, as an operating data value, an instantaneous temperature at a predetermined position adjacent the motor.

11. The method according to claim 8, further comprising saving, as an operating data value, an instantaneous number of operating hours of the motor.

12. The method according to claim 8, further comprising saving, as an operating data value, a count of the number of commutations of the motor performed until the moment of the error.

13. The method according to claim 8, further comprising, after saving said data in the nonvolatile memory, performing readout of said data via a data connection.

14. The method according to claim 13, further comprising reading the data out of the nonvolatile memory and outputting the data via a serial bus.

15. The method according to claim 8, further comprising performing both controlling of electronic commutation of said motor, and error processing, in the same microprocessor.

16. The method according to claim 8, further comprising running the error monitoring routine when no higher-priority routine exists at the moment.

17. The method according to claim 8, further comprising, prior to execution of the error monitoring routine, transferring, into a volatile memory associated with the microprocessor and addressable thereby, the at least one parameter for the error monitoring routine stored in the nonvolatile memory.

18. The method according to claim 8, comprising the steps of:

saving parameters for the error monitoring routine in at least one register of the nonvolatile memory; and executing the error monitoring routine in accordance with said parameters in order to control the motor accordingly.

19. The method according to claim 18, further comprising, prior to execution of the error monitoring routine, transferring the parameters, saved in the nonvolatile memory of the motor for the error monitoring routine, into a volatile memory associated with the microprocessor and addressable thereby.

20. The method according to claim 19, further comprising performing said transferring of the parameters for the error monitoring routine into the volatile memory whenever the motor is switched on.

21. The method according to claim 19, further comprising performing said transferring of the parameters for the error monitoring routine into the volatile memory upon each reset operation of the microprocessor.

22. The method according to claim 8, further comprising storing in the nonvolatile memory at least one parameter which controls whether or not information about an error is to be saved.

23. The method according to claim 8, further comprising storing, in the nonvolatile memory at least one parameter which controls which digital value characterizing said error is to be associated, when the error is saved, with said error or with a predetermined group of errors.

24. The method according to claim 8, further comprising storing, in the nonvolatile memory, at least one parameter be which controls the rotation speed of the motor upon occurrence of an error.

25. The method according to claim 8, further comprising configuring said routines of different priorities, at least partially, as routines that can be requested by means of a request signal, a sequence of program steps necessary for operation of the motor being processed after each execution of a requested routine, before a next requested routine begins.

26. The method according to claim 25, wherein the sequence of program steps necessary for operation of the motor comprises a routine that polls a data bus provided on the motor.

27. The method according to claim 26, wherein a maximum duration of the routines used is defined by a desired baud rate of the data transfer via the data bus.

28. The method according to claim 8, wherein commutation of the motor is accomplished during an interrupt operation that interrupts the program execution.

29. The method according to claim 8, further comprising, in an electronically commutated motor having a Hall generator for sensing its rotor position, the step of triggering an interrupt operation by a predetermined kind of change in the output signal of said Hall generator.

* * * * *